United States Patent
Cosse et al.

(10) Patent No.: US 9,791,081 B2
(45) Date of Patent: Oct. 17, 2017

(54) FLUID SYSTEM CONNECTION NOZZLE ASSEMBLY

(71) Applicant: OPW-Engineered System, Inc., Lebanon, OH (US)

(72) Inventors: Carlos Cosse, Calgary (CA); Jaskaran Gill, Calgary (CA); Don Johnson, Mason, OH (US)

(73) Assignee: OPW-ENGINEERED SYSTEMS, INC., Lebanon, OH (US)

( * ) Notice: Subject to any disclaimer, the term of this patent is extended or adjusted under 35 U.S.C. 154(b) by 80 days.

(21) Appl. No.: 14/700,686

(22) Filed: Apr. 30, 2015

(65) Prior Publication Data

US 2016/0319993 A1 Nov. 3, 2016

(51) Int. Cl.
| | | |
|---|---|---|
| *F17C 13/00* | (2006.01) | |
| *F16L 25/06* | (2006.01) | |
| *F16L 21/08* | (2006.01) | |
| *F17C 6/00* | (2006.01) | |
| *F16L 37/36* | (2006.01) | |
| *F16L 37/18* | (2006.01) | |

(52) U.S. Cl.
CPC .............. *F16L 37/36* (2013.01); *F16L 37/18* (2013.01)

(58) Field of Classification Search
CPC ............................ F17C 13/00; F17C 2270/01; F17C 2221/033; F17C 2205/037; F16L 25/06; F16L 21/08; F16C 6/00
USPC .................................. 141/1; 285/401; 29/428
See application file for complete search history.

(56) References Cited

U.S. PATENT DOCUMENTS

| | | |
|---|---|---|
| 4,203,534 A | 5/1980 | Finke |
| 4,387,564 A | 6/1983 | Carey |
| 5,301,723 A | 4/1994 | Goode |
| (Continued) | | |

FOREIGN PATENT DOCUMENTS

GB 394937 7/1933

OTHER PUBLICATIONS

Alternative Fuel Products, retrieved from http://globalfluid.com/Alternative_fuel.htm, available on information and belief at least as early as Jul. 17, 2013, 13 pages.

(Continued)

*Primary Examiner* — Timothy L Maust
*Assistant Examiner* — Andrew Schmid
(74) *Attorney, Agent, or Firm* — Workman Nydegger

(57) ABSTRACT

A connection nozzle assembly includes an inner fluid product tube, a tube sleeve secured about the fluid product tube, an outer nozzle sleeve, and a locking mechanism disposed between the fluid product tube and the nozzle sleeve. The nozzle sleeve includes a body portion and a rear portion, each being moveable between a plurality of locking positions. The body portion has at least one J-groove bracket disposed therein and the rear portion has a guide element extending into the bracket. The locking mechanism includes at least one clamping member moveable between a plurality of clamping positions and at least one drop pin moveable between a raised position and a lowered position. The nozzle sleeve is moved between the plurality of locking positions, thereby engaging the locking mechanism to secure the connection nozzle assembly to a receptacle coupling. The connection nozzle assembly can be uncoupled by reversing the nozzle sleeve.

22 Claims, 11 Drawing Sheets

(56) References Cited

U.S. PATENT DOCUMENTS

| | | |
|---|---|---|
| 5,404,909 A | 4/1995 | Hanson |
| 5,482,094 A | 1/1996 | Mitchell |
| 5,875,976 A * | 3/1999 | Nelson .................... A61M 5/30 239/329 |
| 6,142,194 A | 11/2000 | McClaran |
| 6,343,630 B1 | 2/2002 | Dubinsky |
| 6,945,477 B2 | 9/2005 | Lambert |
| 2006/0022464 A1* | 2/2006 | Lambert ............... A61M 16/08 285/376 |
| 2007/0144611 A1 | 6/2007 | Robinson et al. |

OTHER PUBLICATIONS

International Search Report and Written Opinion for PCT/US16/29983 mailed Oct. 7, 2016.

\* cited by examiner

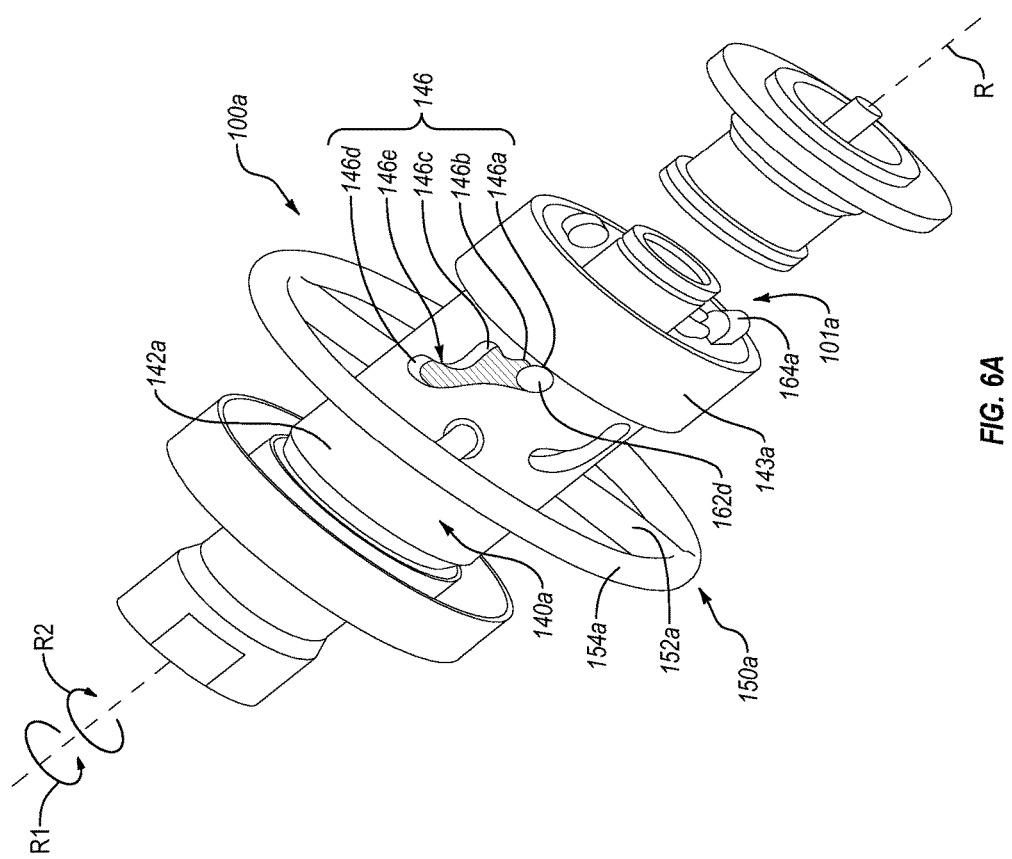

FLUID SYSTEM CONNECTION NOZZLE ASSEMBLY

CROSS REFERENCE TO RELATED APPLICATIONS

N/A.

BACKGROUND

1. Technical Field

Exemplary embodiments of the present disclosure relate to connection components for fluid systems, and more particularly, to connection nozzle assemblies adapted to couple with a fluid system receptacle, and systems incorporating the same.

2. Relevant Technology

In a fluid system environment, fluids may be transferred from one receptacle (e.g., tank, pod, container, etc.) to another. For instance, in the oil and gas industry, fluids are transferred from storage tanks to transport vehicles (e.g., tanker trucks, railroad cars, ships, etc.), and vice versa, so that the fluids may be transported to and from various locations. To transfer the fluid from the storage tank to the transport vehicles, and vice versa, the fluids are pumped through a fluid transfer system. These fluid transfer systems often include conduits (e.g., hoses, pipes, receptacle couplers, pipe couplers, nozzles, inlets, outlets, etc.) that must be securely coupled together and/or to the receptacle to allow the fluid product to flow from one receptacle to another.

Liquefied natural gas (LNG) is one example of a fluid that may be transferred through the fluid transfer systems described above. For instance, a transport tanker truck with a receptacle for carrying LNG may have a coupler in selective fluid communication with the internal compartment of the receptacle. At a fluid transfer station, a fluid system hose (e.g., 1" LNG hose) can be attached to the coupler by means of a connection nozzle designed to securely couple with both the hose and the coupler.

A variety of considerations may be taken into account when designing a connection nozzle. For instance, the nozzle may need to accommodate a certain pressure, volume, force, or other minimum standard, or have a certain size, weight, etc. in order to be suitable for use in the industry. In addition, the nozzle may need to be selectively attachable and/or detachable on demand while providing a secure, sealed, and/or fluid-tight connection in the attached position. The nozzle may need to be securable and releasable by a person having ordinary strength. In addition, the attachment/detachment process may need to be intuitive so as to ensure proper coupling by a lay person.

Accordingly, there are a number of considerations that can be address in the area of connection nozzle assemblies and systems incorporating the same.

BRIEF SUMMARY

Exemplary embodiments of the present disclosure relate to connection nozzle assemblies for coupling fluid system conduits to fluid product receptacles and to systems and methods incorporating the same. An illustrative connection nozzle assembly can include an inner fluid product tube, a tube sleeve secured about the fluid product tube, an outer nozzle sleeve, and/or a locking mechanism (e.g., disposed between the fluid product tube and the nozzle sleeve). The connection nozzle assembly (and/or nozzle sleeve thereof) can be moveable between a plurality of locking positions. The nozzle sleeve can include a body having at least one bracket (e.g., a J-groove bracket with a plurality of slots corresponding to the plurality of locking positions) disposed therein. The locking mechanism can include at least one guide element extending into the bracket, at least one clamping member moveable between a plurality of clamping positions, and/or at least one drop pin moveable between a raised position and a lowered position.

The nozzle can be moved between the plurality of locking positions. For instance, the nozzle sleeve can be advanced between the plurality of locking positions, thereby engaging the locking mechanism to secure the connection nozzle assembly to a receptacle coupling. The connection nozzle assembly can be uncoupled by reversing the movement of the nozzle sleeve. For instance, an illustrative method of using a connection nozzle assembly can include joining the connection nozzle assembly with a receptacle coupling and moving the nozzle from a first locking position to a second locking position thereby causing movement of the at least one clamping member from a first clamping position to a second clamping position. The method can also include moving the nozzle into optional third and/or fourth locking position. Movement of the nozzle sleeve can cause a corresponding movement of the fluid product tube, tube sleeve, locking mechanism, and/or other component(s) of the nozzle (or one or more sub-components thereof).

BRIEF DESCRIPTION OF THE DRAWINGS

In order to describe the manner in which the above-recited and other advantages and features of the invention can be obtained, or to further clarify the above and other advantages and features of the present disclosure, a more particular description of the disclosure briefly described above will be rendered by reference to specific implementations and/or embodiments thereof which are illustrated in the appended drawings. Understanding that these drawings depict only typical implementations and/or embodiments of the disclosure and are not therefore to be considered to be limiting of its scope, the invention will be described and explained with additional specificity and detail through the use of the accompanying drawings in which:

FIG. 6A illustrates a perspective view of an exemplary connection nozzle assembly in a first locking position according to another embodiment of the present disclosure.

DETAILED DESCRIPTION

Figure 1A:
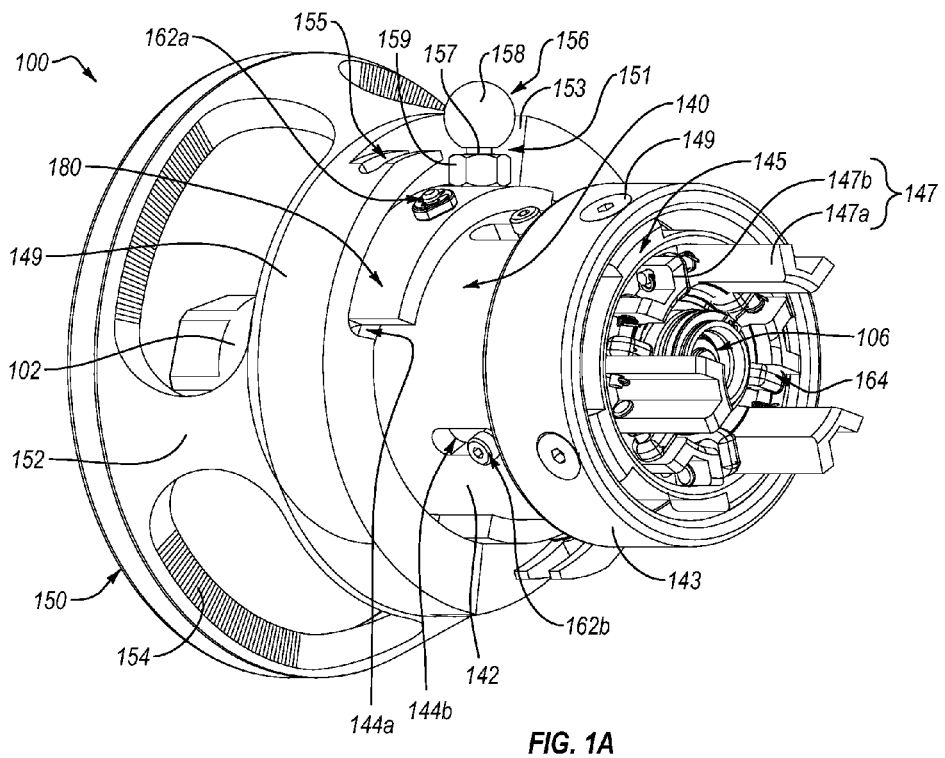
FIG. 1A illustrates a front perspective view of an exemplary connection nozzle assembly in a first locking position according to an embodiment of the present disclosure.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure, and is not necessarily intended to limit the scope of the disclosure in any manner. Thus, while the present disclosure will be described in detail with reference to specific configurations, the descriptions are illustrative and are not to be construed as limiting the scope of the claimed invention. Various modifications can be made to the illustrated configurations without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "exemplary embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "line" includes one, two, or more lines. Similarly, reference to a plurality of referents should be interpreted as comprising a single referent and/or a plurality of referents unless the content and/or context clearly dictate otherwise. Thus, reference to "lines" does not necessarily require a plurality of such lines. Instead, it will be appreciated that independent of conjugation; one or more lines are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "rear," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

It is also noted that systems, methods, apparatus, devices, products, processes, and/or kits, etc., according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

Exemplary embodiments of the present disclosure relate to connection components for fluid systems, and more particularly, to connection nozzle assemblies adapted to be coupled to a fluid system receptacle, and systems and methods incorporating the same. An illustrative connection nozzle assembly can include an inner fluid product tube configured for transporting a fluid product. As used herein, "fluid" is not limited to liquids, but can include a variety of other compositions. For example, the term "fluid," as used herein, may include liquids, gases, liquid-gas combinations, slurries, gelatinous substances, semi-solid substances, liquid-solid combinations, gas-solid combinations, and liquid-solid-gas combinations.

The fluid product tube can have an encircling side wall that extends axially from a first end of the fluid product tube to an opposing second end of the fluid product tube. The encircling side wall can comprise a tubular structure having a circular cross-sectional shape or configuration in some embodiments. However, as used herein, "encircling" is not limited to circular and/or entirely surrounding configurations. For instance, the encircling side wall can have a rounded, a geometric, or other cross-sectional shape without departing from the scope of this disclosure. The side wall can at least partially bound a fluid product conduit extending through the fluid product tube and/or can have at least one fluid product opening therein. In at least one embodiment, the fluid product conduit can comprise a separate tube (having an encircling side wall and/or one or more fluid product openings) disposed within the fluid product tube.

The fluid product tube can also have an end wall disposed at the first end of the fluid product tube. The end wall can have a closed configuration so as to substantially seal the fluid product tube and/or fluid product conduit at the first end of the fluid product tube. Accordingly, the tube can have a closed end and one or more openings in the side wall adjacent to the closed end. The fluid product tube can be configured or adapted to have a fluid product pass therethrough.

The second end of the tube can be coupled to a fluid product source. For instance, the second end of the tube can comprise a threaded or compression coupling end that can be attached to an adapter or coupling. The adapter or coupling can bring the fluid product tube (or conduit thereof) into fluid communication with the fluid product source and/or can be selectively configurable so to do. The second end of the tube can also or alternatively be coupled to a conduit (e.g., hose or pipe). The conduit can be coupled to the fluid product source in some embodiments.

In at least one embodiment, the second end of the fluid product tube can have at least one breakaway or breakaway element attached thereto. For instance, the second end of the fluid product tube can be connected to two halves or members of a breakaway element. In at least one embodiment, one half of the breakaway element can be incorporated into the connection nozzle assembly (e.g., adjacent to the second end of the fluid product tube. In an alternative embodiment, the breakaway element can be coupled to a conduit connected to the second end of the tube. For instance, a hose can be disposed between the fluid product tube and the breakaway element in some embodiments. Accordingly, a first hose section can connect the fluid product source to a first half of a breakaway element, a second hose can connect the connection nozzle assembly (or fluid product tube thereof) to a second half of the breakaway element, and the two halves of the breakaway element can be connectable, thereby connecting the fluid product source to the connection nozzle assembly (or fluid product tube thereof).

The connection nozzle assembly can also include a tube sleeve disposed and/or secured about a portion of the fluid product tube. For instance, the tube sleeve can be disposed and/or secured about a portion of the encircling side wall and/or end wall. The tube sleeve can be adapted to selectively cover and uncover the at least one fluid product opening in the side wall of the fluid product tube and/or at least one (pressure release) opening in a receptacle coupling to which the nozzle assembly is connected. In at least one embodiment, the tube sleeve can be slidably moveably between a closed position in which the tube sleeve covers and substantially seals at least one opening and an open position in which the tube sleeve uncovers the at least one opening. For instance, the tube sleeve can be axially (or circumferentially) rotatable about the side wall (e.g., between a closed position and an open position). The tube sleeve can also or alternatively be axially (linearly) slidable about the side wall (e.g., between a retracted position and a forward position).

The tube sleeve can slide in a first axial linear direction (toward the receptacle coupling) into the forward position and/or in a second axial linear direction opposite the first axial linear direction into the retracted position. In the forward position, the tube sleeve can cover the at least one opening in the receptacle coupling (e.g., to create a fluid-tight seal between the connection nozzle assembly and the receptacle coupling). In the retracted position, the tube sleeve can uncover the at least one opening in the receptacle coupling (e.g., to release fluid and/or pressure disposed between the connection nozzle assembly and the receptacle coupling). In one or more positions, the tube sleeve can also cover the at least fluid product opening in the encircling side wall of the fluid product tube. For instance, the tube sleeve can cover the at least fluid product opening in the encircling side wall of the fluid product tube when the fluid product tube is in one or more retracted positions (with the tube sleeve in the forward and/or retracted position). On the other hand, the tube sleeve can uncover the at least fluid product opening in the encircling side wall of the fluid product tube when the fluid product tube is moved into one or more forward or protruding positions (with the tube sleeve in the forward and/or retracted position).

The connection nozzle assembly can also include an outer nozzle sleeve disposed about the fluid product tube and/or tube sleeve. The nozzle sleeve can substantially encircle at least a portion of the fluid product tube and/or tube sleeve in some embodiments. The connection nozzle assembly (and/or nozzle sleeve thereof) can be moveable between a plurality of locking positions. The nozzle sleeve can comprise a body portion and an optional collar that extends radially outward from the body of the nozzle sleeve. In at least one embodiment, the body can have at least one bracket disposed therein. For instance, the body can have at least one J-groove bracket extending therethrough. In some embodiments, the body can have at least two, at least three, at least four, or at least five (J-groove) brackets disposed therein. The brackets can be disposed and/or distributed (evenly) about the body of the nozzle sleeve. In certain embodiments, the bracket can have a plurality of slots corresponding to the plurality of locking positions. The plurality of slots can occupy different locations in the body of the nozzle sleeve. For instance, the plurality of slots can be separated by an axial linear distance and/or a circumferential distance.

In at least one embodiment, the nozzle sleeve can be axially rotatable and axially slidable between the plurality of locking positions. For instance, axial rotation of the nozzle sleeve in a first axial rotational direction can cause axial linear movement of the nozzle sleeve in a first axial linear direction (e.g., by means of the (J-groove) bracket). Similarly, axial rotation of the nozzle sleeve in a second axial rotational direction (opposite the first axial rotational direction) can cause axial linear movement of the nozzle sleeve in a second axial linear direction (opposite the first axial linear direction). Further rotation can progressively advance the connection nozzle assembly and/or nozzle sleeve through the plurality of locking positions.

The nozzle sleeve can also have a handle for rotating the nozzle sleeve. The handle can comprise one or more rods extending from the body of the nozzle sleeve. The handle can also include a circumferentially-disposed handle element (e.g., wheel) disposed about the body of the nozzle sleeve.

The connection nozzle assembly can also include a locking mechanism, which can be disposed between a portion of the outer nozzle sleeve and a portion of the inner product tube or tube sleeve. Accordingly, the tube sleeve can be disposed at least partially between the fluid product tube and the locking mechanism in at least one embodiment. The locking mechanism can include a guide element (e.g., shoulder bolt, post, etc.) extending into the at least one (J-groove) bracket. The guide element can be adapted to be moved between the plurality of slots in the bracket. For instance, rotation of the nozzle sleeve can cause the slots of the J-groove bracket to move about the guide element, thus causing the guide element to be moved between the plurality of slots in the bracket. Thus, rotation of the nozzle sleeve can cause the guide element to be relocated within a different slot. Disposing and/or securing of the guide element in a particular slot can constitute and/or correspond with disposing the connection nozzle assembly (or nozzle sleeve thereof) in a particular locking position.

The locking mechanism can also include at least one clamping member. In certain embodiments, the clamping member(s) can be disposed adjacent to the first end of the fluid product tube. The locking member(s) and first end of the fluid product tube can also be adjacent to and/or associated with a first end of the connection nozzle assembly and/or nozzle sleeve thereof. The clamping member(s) can comprise an at least partially circular or elliptical body, can have at least one substantially flat surface, and/or can have a recessed notch disposed in the body. In some embodiments, the clamping member can be biased into an open or receiving position (e.g., by a biasing element).

The clamping member(s) can be moveable between a plurality of clamping positions. For instance, the clamping member(s) can be rotatable between at least a first clamping position (e.g., an open or receiving position) and one or more additional clamping positions (e.g., one or more securing positions). In at least one embodiment, movement of the nozzle sleeve between locking positions causes a corresponding movement of the clamping member(s) between clamping positions. For instance, the nozzle sleeve can move forward (in the first axial linear direction) over the top of the clamping member(s) as the nozzle sleeve is rotated in the first axial rotational or circumferential direction. The nozzle sleeve can thereby depress the clamping member(s), causing the clamping member(s) to rotate in a first radial rotational direction (i.e., downward in the first axial linear direction) from the first clamping position into a second clamping position.

As indicated above, the first clamping position can comprise an open and/or receiving position that allows for insertion of a portion of the receptacle coupling into a receiving area of the connection nozzle assembly. Movement of the one or more clamping members into the one or more additional clamping positions (e.g., second, third, fourth, etc.) can secure the receptacle coupling to the connection nozzle assembly and/or draw the receptacle coupling further into the receiving area thereof. For instance, movement of the one or more clamping members progressively through a series of clamping positions can progressively draw the receptacle coupling further into the receiving area. In at least one embodiment, however, the clamping member(s) can comprise at least one substantially flat surface. Rotation of the clamping member(s) such that the nozzle sleeve is disposed against the substantially flat surface can allow the nozzle sleeve to pass over the clamping member(s) without (necessarily) continuing to rotate the clamping member(s). Accordingly, the clamping member(s) can rotate to a final and/or completely secured clamping position in certain embodiments.

The locking mechanism can also include at least one drop pin, which can be moveable between a raised position and a lowered position. In some embodiments, the drop pin can be biased in or into the raised position (e.g., by a biasing element). The drop pin can prevent the tube sleeve from moving past the retracted position of the tube sleeve (i.e., in the second axial linear direction) in some embodiments. For instance, the tube sleeve can have a face configured to engage with the drop pin in the raised position and/or to prevent passage of the tube sleeve past the drop pin when the drop pin is in the raised position.

The drop pin can also move the tube sleeve from the retracted position in the first axial linear direction and/or into the forward position in some embodiments. For instance, the tube sleeve can have a sloping edge adjacent to and extending away from the face in the second axial linear direction. Accordingly, depressing of the drop pin into the lowered position can apply a force to the tube sleeve on the sloping edge thereby causing axial linear movement of the tube sleeve in the first axial linear direction and releasing the drop pin into the raised position removes the force applied on the sloping edge thereby allowing axial linear movement of the tube sleeve in the second axial linear direction in some embodiments. The drop pin can also have a second face at the bottom of the sloping edge to prevent the tube sleeve from moving from the forward position into the retracted position (i.e., in the second axial linear direction) when the drop pin is in the lowered position.

In at least one embodiment, the connection nozzle assembly can be attached to a receptacle coupling having one or more holes disposed therein. For instance, the receptacle coupling can comprise a conduit (e.g., a tubular spout) having an axial opening in the end thereof. The axial opening can comprise a fluid product opening configured to transfer a fluid product from a receptacle to which the receptacle coupling is attached and by which the receptacle coupling can be in fluid communication with a connection nozzle attached to the receptacle coupling. In addition, the receptacle coupling can include one or more radial or circumferential openings in the encircling side wall of the conduit. In at least one embodiment, the one or more radial or circumferential openings in the encircling side wall can comprise a pressure opening (e.g., pressure release holes, present holes, etc.) At least one configuration for a receptacle coupling can be established as an industry standard around or according to which various connection nozzles can be designed. Accordingly, in at least one embodiment, the connection nozzle assemblies of the present disclosure can be configured for attachment to an industry standard receptacle coupling.

In one or more embodiments, the tube sleeve can cover the one or more radial and/or circumferential openings in the encircling side wall of the conduit of the receptacle coupling. For instance, when the tube sleeve is in the forward position (e.g., by means of the drop pin being in the lowered position) the tube sleeve can cover the one or more radial and/or circumferential openings (e.g., to create a fluid and/or pressure seal between the receptacle coupling and the attached connection nozzle assembly). Raising the drop pin into the raised position can allow the tube sleeve to move into the retracted position thereby uncovering the one or more radial and/or circumferential openings (e.g., releasing fluid and/or pressure in the connection between the receptacle coupling and the attached connection nozzle assembly).

In some embodiments, the connection nozzle assembly can also include one or more biasing elements (e.g., springs (e.g., linear springs and/or torsion spring), coils, elastomeric elements, cushions, etc.). For instance, the connection nozzle assembly can include a first biasing element that biases the drop pin into the raised position. The connection nozzle assembly can also include a second biasing element that biases the locking mechanism in a first direction and biasing the nozzle sleeve in a second direction opposite the first direction. For instance, second biasing element can bias the locking mechanism in the first axial linear direction and can bias the nozzle sleeve in the second axial linear direction. In at least one embodiment, the second biasing element can be disposed between a portion of the locking mechanism and a portion of the nozzle sleeve. Alternatively, the second biasing element can be disposed between a portion of the locking mechanism and a portion of an attachment element to which the nozzle sleeve is coupled.

In some embodiments, the connection nozzle assembly can also include a third biasing element that biases the tube sleeve in the second axial linear direction. The third biasing element can also bias the locking mechanism in the first axial linear direction in some embodiments. As indicated above, the drop pin can substantially prevent movement of the tube sleeve thereby in the second axial linear direction (e.g., relative to the locking mechanism). Accordingly, the drop pin can have sufficient rigidity and/or sturdiness to resist the biasing effect or force of the third biasing element (e.g., in the raised and/or lowered position). Furthermore, movement of the drop pin (radially inward/downward) into the lowered position can overcome the biasing effect of the third biasing element and force the tube sleeve forward in the first axial linear direction and into the forward position.

In certain embodiments, the connection nozzle assembly can also include a fourth biasing element that biases the one or more clamping members of the locking mechanism into a first clamping position. In at least one embodiment, the fourth biasing element can comprise a torsion spring that rotates the one or more clamping members in a second radial rotational direction (opposite the first radial rotational direction) toward and/or into the first clamping position.

Movement of various components of the connection nozzle assembly can be accomplished by means of rotating the nozzle sleeve in an axial rotational direction. For instance, rotation of the nozzle sleeve in a first axial rotational direction can cause the novel sleeve (and the fluid product tube to which the nozzle sleeve is optionally attached) to move forward in the first axial linear direction (e.g., relative to the locking mechanism and/or tube sleeve).

Furthermore, movement of the nozzle sleeve in the first axial linear direction can cause a portion of the nozzle sleeve to pass over the top of a portion of the clamping member(s) of the locking mechanism, as indicated above. For instance, in at least one embodiment, the nozzle sleeve can comprise a collar that extends radially outward from the body of the nozzle sleeve. Passing of the (collar) portion of the nozzle sleeve over the top of the clamping member(s) can overcome the biasing force of the fourth biasing element and/or cause radial rotational movement of the clamping member(s) into one or more additional clamping positions. For instance, the one or more clamping members can comprise a rounded shape or configuration such that as the nozzle sleeve progressively moves forward over the one or more clamping members, the clamping member(s) progressively rotate (in the first radial rotational direction) through a series of clamping positions. Retraction of the nozzle sleeve in the second axial linear direction can allow the clamping member(s) to reverse rotate (in the second radial rotational direction) back through the series of clamping positions.

In at least one embodiment, movement of the nozzle sleeve in the first axial linear direction can also cause movement of the drop pin into the lowered position. For instance, a portion of the nozzle sleeve can pass over the top of the drop pin and/or push the drop pin into the lowered position. As described previously, movement of the drop in into the lowered position can cause axial linear movement of the tube sleeve in the first axial linear direction into the forward position.

In an alternative embodiment, the connection nozzle assembly can include a variety of additional and/or alternative components. For instance, the outer sleeve can comprise a rear portion connected to a handle and a body (e.g., front portion) connected to the rear portion. The front portion can have at least one bracket (e.g., J-groove bracket) disposed therein. The at least one bracket can have one or more (e.g., opposing) sliding edges. Specifically, the at least one bracket may not include locking slots in certain embodiments. Instead, the at least one bracket can comprise one or more smooth side wall. A guide element can extend from the rear portion of the outer sleeve into the at least one bracket. In at least one embodiment, axial rotation of the handle can cause axial rotation of the rear portion, which can cause the guide element extending from the rear portion to move through the bracket in the front portion, which can cause axial linear movement of the front portion. Thus, the rear portion can be configured to move between a plurality of axial rotational locking positions and/or the front portion can be configured to move between a plurality of axial linear (sliding) locking positions.

In some embodiments, the front portion can also have at least a second bracket (e.g., an axial linear extending bracket). The locking mechanism (or body portion thereof) can also have a guide element extending therefrom into the second bracket. In at least one embodiment, the second bracket and guide element can prevent the front portion of the outer sleeve from sliding beyond a predetermined range of motion. For instance, the second bracket and guide element can substantially prevent significant axial rotation of the front portion. In addition, the second bracket and guide element can substantially prevent axial linear movement of the front portion beyond a predetermined range of motion in the first and/or second axial linear directions.

In at least one embodiment, the inner fluid product tube need not be directly or indirectly, threadedly attached to the outer sleeve and/or handle. For instance, in certain embodiments, the connection nozzle assembly can also include an inner tube guide sleeve. The inner tube guide sleeve can also have at least one bracket (e.g., J-groove bracket) disposed therein. Another guide element can extend from the rear portion of the outer sleeve into the bracket of the inner tube guide sleeve. In at least one embodiment, axial rotation of the rear portion can cause the guide element extending from the rear portion to move through the bracket in the inner tube guide sleeve, which can cause axial linear movement of the inner tube guide sleeve, which can cause axial linear movement of the inner fluid product tube. Thus, movement of the rear portion of the outer sleeve between the plurality of axial rotational locking positions can cause movement of the inner tube guide sleeve and the front portion of the outer sleeve.

In at least one embodiment, the inner tube guide sleeve and the front portion of the outer sleeve can be configured to move substantially independent of one another. For instance, the bracket of the inner tube guide sleeve can be configured differently than the bracket of the front portion of the outer sleeve. In certain embodiments, the bracket of the front portion of the outer sleeve can have a substantially uniform slope. For instance, the bracket can be disposed in a substantially linear configuration, extending diagonally about the circumference of the front portion of the outer sleeve (e.g., in both the axial linear direction and the axial rotational direction). Accordingly, axial rotational movement of the rear portion of the outer sleeve can cause a corresponding axial linear movement of the front portion of the outer sleeve. Nonlinear and/or other configurations are also contemplated herein.

In one or more embodiments, the bracket of the inner tube guide sleeve can have a non-uniform slope. For instance, the bracket of the inner tube guide sleeve can be configured such that rotation of the rear portion of the outer sleeve within a first range or rotational distance can cause little or no axial linear movement of the inner tube guide sleeve. Thus, the bracket of the inner tube guide sleeve can have a substantially linear portion extending substantially circumferentially therethrough. The bracket of the inner tube guide sleeve can also have a non-linear (e.g., curved or angled) portion (adjacent to the substantially linear portion). The nonlinear portion can extend diagonally about the circumference of the inner tube guide sleeve. Accordingly, rotation of the rear portion of the axle sleeve within a second range or rotational distance can cause substantial axial linear movement of the inner tube guide sleeve.

In some embodiments, the nozzle sleeve and/or locking mechanism thereof can include at least one locking element. In certain embodiments, the locking element can prevent the front portion of the outer sleeve from retracting (i.e., moving in the second axial linear direction). For instance, the locking element can extend through the rear portion of the outer sleeve and contact the upper surface of the front portion of the outer sleeve when the front portion is in one or more of the plurality of locking positions. The locking element can also be biased against the surface of the front portion such that when the front portion moves a sufficient distance in the first axial linear direction, the locking element can move behind the end of the front portion and prevent the front portion from retracting. Specifically, in at least one embodiment, the locking element can ride on top of the outer surface of the front portion until the front portion is moved into the forward most position, at which time the locking element can drop in behind the rear end of the front portion. The locking element can be sufficiently rigid to maintain structural integrity under the force of the rearward-biased outer sleeve, thereby preventing the front portion from retracting.

Reference will now be made to the drawings to describe various aspects of exemplary embodiments of the present disclosure. It is understood that the drawings are diagrammatic and/or schematic representations or illustrations of such exemplary embodiments, and are not limiting of the present invention, nor are they necessarily drawn to scale. No inference should therefore be drawn from the drawings as to the dimensions of any system, apparatus, component, or element of the present disclosure. In the following description, numerous specific details are set forth in order to provide a thorough understanding of the present disclosure and embodiments described herein. It will be appreciated, however, by one of ordinary skill in the art, that the present disclosure may be practiced without one or more of these specific details.

Those skilled in the art will also appreciate that cross-sectional views illustrated in the figures of the present disclosure have been altered to include many relevant components that may not have been otherwise visible and/or illustrated in a true cross-section of the connection nozzle assemblies illustrated in perspective views herein. Furthermore, the cross-sectional views illustrated in the figures of the present disclosure are depicted in symmetry about a central plane or axis. Those skilled in the art will appreciate, however, that the connection nozzle assemblies of the present disclosure need not have complete symmetry.

Figure 1B:
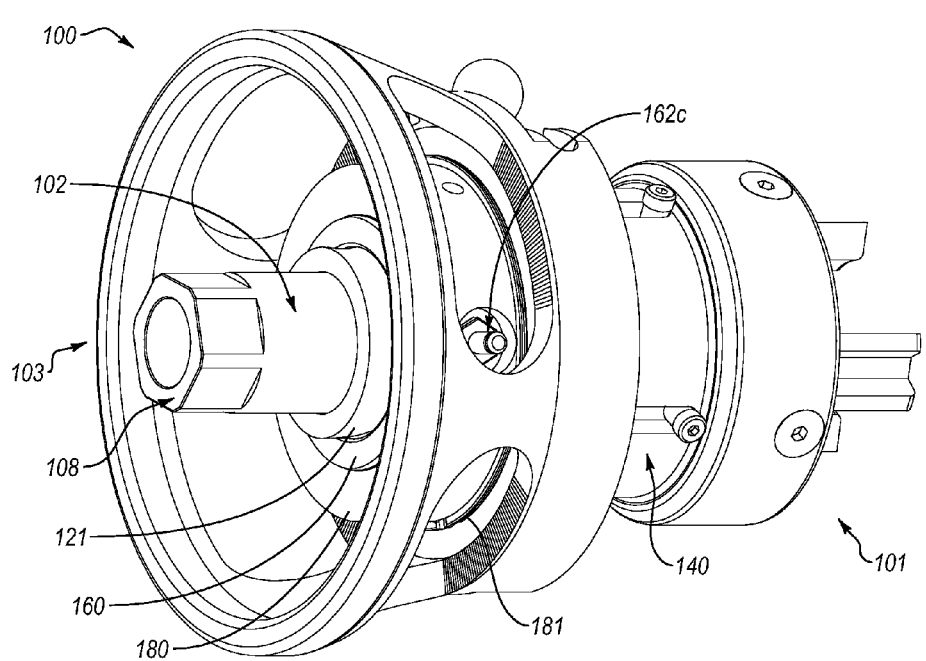
FIG. 1B illustrates a rear perspective view of the connection nozzle assembly of FIG. 1A.
Figure 1C:
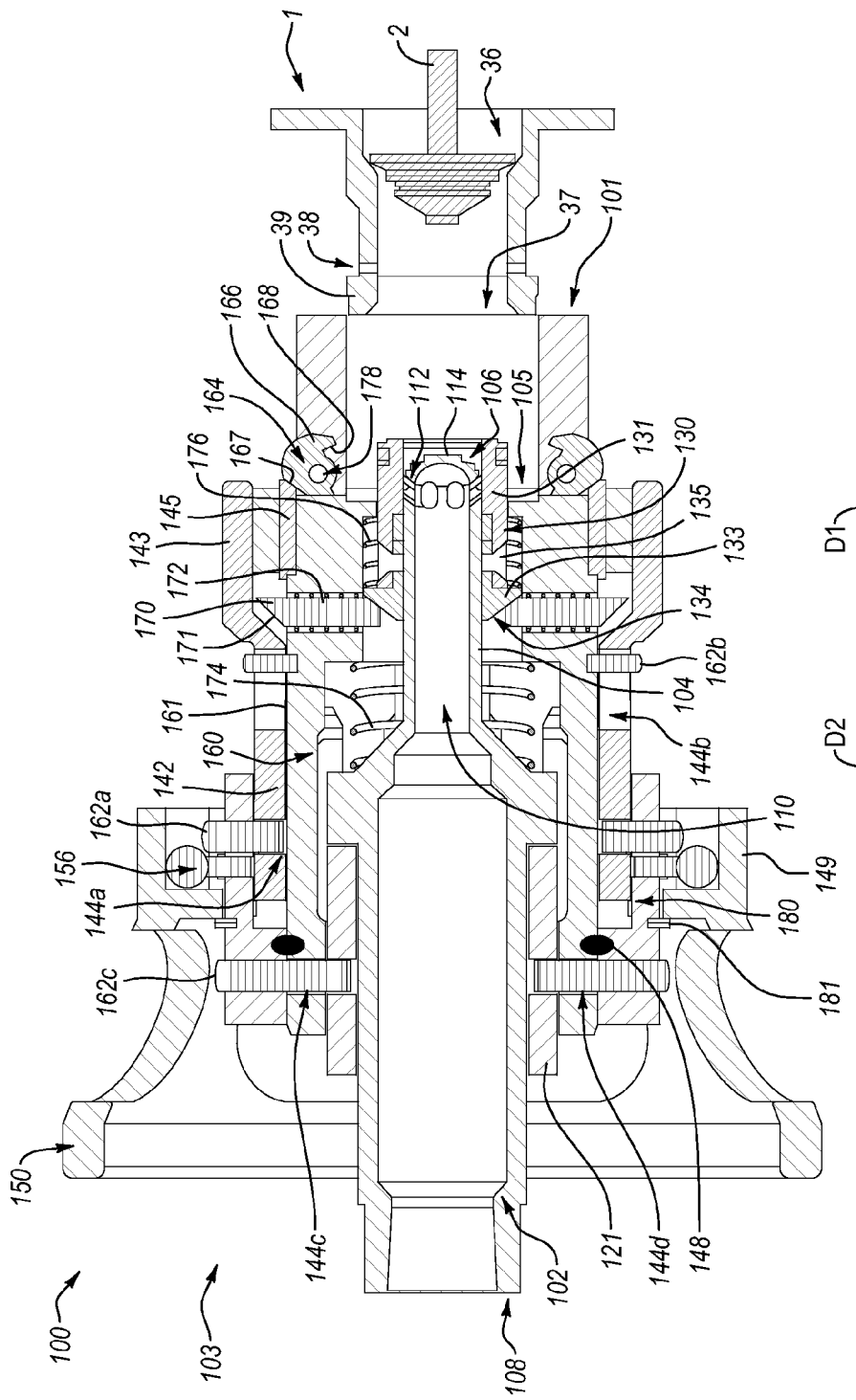
FIG. 1C illustrates a cross-sectional view of the connection nozzle assembly of FIG. 1A.

FIGS. 1A and 1B illustrate front and rear perspective views, respectively, of an exemplary connection nozzle assembly 100 according to an embodiment of the present disclosure. FIG. 1C illustrates a cross-sectional view of the connection nozzle assembly 100 illustrated in FIGS. 1A and 1B. Connection nozzle assembly 100 comprises an inner fluid product tube 102, a tube sleeve 130 (encircling a (front) portion of tube 102), a guide sleeve 121 (encircling a (rear) portion of tube 102), a locking mechanism 160 (encircling a portion of tube sleeve 130 and/or guide sleeve), an outer nozzle sleeve (encircling a portion of locking mechanism 160 and comprising a front body portion and a rear portion connected to the body portion), and a handle 150 (encircling a portion of locking mechanism 160.

Fluid product tube 102 can be configured for transporting a fluid product. Fluid product tube 102 can have an encircling side wall 104 that extends axially from a first end 106 of fluid product tube 102 to an opposing second end 108 of fluid product tube 102. First end 106 of tube 102 can correspond to a first end 101 of connection nozzle assembly 100 and end 108 can correspond to a second end 103 of connection nozzle assembly 100.

Side wall 104 of fluid product tube 102 can at least partially bounds a fluid product conduit 110 extending through tube 102. In certain embodiments, fluid product conduit 110 can comprise a void or space at least partially bound by side wall 104. Side wall 104 can also have at least one fluid product opening 112 therein. For instance, tube 102 can have a plurality of openings 112 disposed circumferentially around side wall 104. Fluid product tube 102 can also have an end wall 114 disposed at first end 106. End wall 114 can have a closed configuration so as to substantially seal fluid product conduit 108 at first end 106 of fluid product tube 102. Accordingly, the tube can have a closed end 106 and one or more openings 112 in side wall 104 adjacent to closed end 106. In an alternative embodiment, fluid product conduit 110 can comprise a separate tube (having an encircling side wall and/or one or more fluid product openings in fluid communication with opening(s) 112) disposed within fluid product tube 102.

Second end 108 of tube 102 can be coupled to a fluid product source (not shown). For instance, second end 108 of tube 102 can comprise a threaded member that can be attached to a conduit (e.g., via an adapter or coupling), which can bring fluid product tube 102 (or conduit 110 thereof) into fluid communication with the fluid product source and/or can be selectively configurable so to do.

In at least one embodiment, second end 108 of the fluid product tube 102 can have at least one breakaway or breakaway element (not shown) attached thereto. For instance, second end 108 of the fluid product tube 102 can be connected to two halves or members of breakaway element. In an alternative embodiment, the breakaway element can be coupled to a conduit (not shown) connected to second end 108 of tube 102. For instance, a hose (not shown) can be disposed between fluid product tube 102 and the breakaway element in some embodiments.

In at least one embodiment, separating the breakaway element from connection nozzle assembly 100 by a hose or pipe can reduce the weight of connection nozzle assembly 100 significantly. Accordingly, one or more embodiments can include connection nozzle assembly 100 having a first end of a first conduit coupled to second end 108 of tube 102 (or the second end 103 of connection nozzle assembly 100) and a second end of the first conduit coupled to breakaway element. The breakaway element can also be coupled to a first end of a second conduit, with a second end of the second conduit coupled with a fluid product source.

Connection nozzle assembly 100 can also include a tube sleeve 130 disposed and/or secured about a (front) portion of fluid product tube 102. For instance, tube sleeve 130 can be disposed and/or secured about a portion of encircling side wall 104 and/or end wall 114. Tube sleeve 130 can be adapted to selectively cover and uncover fluid product opening(s) 112 in side wall 104 and/or opening(s) 38 in receptacle coupling 1. For instance, tube sleeve 130 can include a sealing element 131. Tube sleeve 130 can have an engaging member 133 with a sloping edge 134 extending down one side of engaging member 133 (in a second axial linear direction D2). In an embodiment, sealing element 131 can be connected to engaging member 133 via a fastener 135. In other embodiments, sealing element 131 and engaging member 133 can comprise different portions of a single component; tube sleeve 130.

Connection nozzle assembly 100 can also include a locking mechanism 160, which can be disposed between a portion of tube sleeve 130 and a portion of nozzle sleeve 140 in some embodiments. Accordingly, tube sleeve 130 can be disposed at least partially between fluid product tube 102 and locking mechanism 160. Locking mechanism 160 can include at least one clamping member 164. In certain embodiments, clamping member(s) 164 can be disposed adjacent to first end 106 of fluid product tube 102. For instance, locking mechanism 140 can include one or more support members 147 for securing clamping member(s) 164 adjacent to first end 106 of fluid product tube 102.

Clamping member(s) 164, support members 147, and first end 106 of fluid product tube 102 can also be adjacent to and/or associated with first end 101 of connection nozzle assembly 100 and/or nozzle sleeve 140 thereof. Support member 147 can comprise at least one extended support member 147a and/or at least one shortened support member 147b. Clamping member(s) 164 can comprise an at least partially circular or elliptical body 166, can have at least one substantially flat surface 167, and/or can also have a recessed notch 168 disposed in body 166. Locking mechanism 160 can also include at least one drop pin 170. Drop pin 170 can have a sloping face 171 in some embodiments.

Connection nozzle assembly 100 can also include an outer nozzle sleeve 140 disposed about fluid product tube 102 and/or tube sleeve 130. Nozzle sleeve 140 can comprise a body (front portion) 142 and a rear portion 180 connected thereto. Body 142 having at least one bracket 144a disposed therein. Bracket 144a can comprise a J-groove bracket. The at least one bracket 144a can have one or more (e.g., opposing) sliding edges. Specifically, the at least one bracket may not include locking slots in certain embodiments. Instead, the at least one bracket can comprise one or more smooth side wall. Moreover, the bracket can be disposed in a substantially linear configuration, extending diagonally about the circumference of the body of the outer sleeve (e.g., in both the axial linear direction and the axial rotational direction). A guide element 162a can extend from the rear portion 180 of outer sleeve 140 into bracket 144a. Rear portion 180 can also have a locking element 156 extending therefrom and/or therethrough. For instance, locking element 156 can comprise a rod or post 157 and an optional gripper (e.g., ball or handle) 158. A fastener 159 can secure locking element 156 to rear portion 180 in some embodiments.

Body 142 can also have at least a second bracket 144b (e.g., an axial linear extending bracket). The locking mechanism (or body portion thereof) can also have a guide element 162b extending therefrom into the second bracket 144b. Guide element 162b can have a rigid configuration suitable for movement and/or disposition within bracket 144. For instance, nozzle sleeve 140 can put a significant amount of force on guide element 162b (e.g., as nozzle sleeve 140 is biased in second axial linear direction D2). Accordingly, guide element 162 can be sufficiently rigid to maintain structural integrity under the biasing force(s) placed on nozzle sleeve 140.

Nozzle sleeve 140 can also have a handle 150 (e.g., for moving (e.g., rotating) rear portion 180 of nozzle sleeve 140 (about a rotational axis R, see FIG. 2A)). Handle 150 can be attached to rear portion 180 via one or more retaining members 181 in some embodiments. Handle 150 can comprise an encircling body portion 149 having one or more rods or arms 152 extending therefrom. Handle 150 can also include a circumferentially-disposed handle or gripping element 154 (e.g., wheel) disposed about body portion 149 and/or connected to arm(s) 152. In addition, handle 150 can comprise a locking element receiving area 151 having an inner end wall 153 and an opposing wedge 155. Wedge 155 can comprise a fork in some embodiments.

Nozzle sleeve 140 can comprise a collar 143 that extends radially outward from body 142. Collar 143 can be coupled to a clamp engaging element 145 in some embodiments. Accordingly, nozzle sleeve 140 (or collar 143 thereof) can be rotatable about clamp engaging element 145 (e.g., by means of a rotational element 148a). Thus, nozzle sleeve 140 (or one or more components thereof) can be rotationally coupled to and/or rotatable about one or more other components of connection nozzle assembly 100. Clamp engaging element 145 can be secured to collar 143 via one or more fasteners 149.

Connection nozzle assembly 100 can also include a guide sleeve 121 disposed and/or secured about a (rear) portion of fluid product tube 102. Guide sleeve 130 can have at least one bracket 144d extending therethrough. A guide element 162c can extend from rear portion 180 of outer sleeve 140 into bracket 144d of guide sleeve 121. For instance, guide element 162c can extend through a portion of locking mechanism 160 in some embodiments.

Nozzle sleeve 140 and/or rear portion 180 can be rotatable about one or more components of connection nozzle assembly 100. For instance, rear portion 180 can be rotatable about locking mechanism 140. Accordingly, connection nozzle assembly 100 can comprise one or more rotational elements 148 in some embodiments. Rotational element 148 can comprise one or more bearings, ball bearings, race bearings, bearing chambers, race bearing chambers, etc.

In some embodiments, connection nozzle assembly 100 can also include one or more biasing elements (e.g., springs (e.g., linear springs and/or torsion spring), coils, elastomeric elements, cushions, etc.). For instance, the connection nozzle assembly can include a first biasing element 172 that biases drop pin 170 in or into a raised position. Connection nozzle assembly 100 can also include a second biasing element 174 that biases locking mechanism 160 in first direction D1 and/or biases nozzle sleeve 140 in second direction D2 (opposite the first direction). In at least one embodiment, second biasing element 174 can be disposed between a portion of locking mechanism 160 and a portion of inner fluid product tube 102. Alternatively, second biasing element 174 can be disposed between a portion of locking mechanism 160 and a portion of an attachment element connected to fluid product tube 102.

In some embodiments, connection nozzle assembly 100 can also include a third biasing element 176 that biases tube sleeve 130 in second axial linear direction D2. Third biasing element 176 can also bias locking mechanism 160 in first axial linear direction D1 in some embodiments. In certain embodiments, connection nozzle assembly 100 can also include a fourth biasing element 178 that biases one or more clamping members 164 of locking mechanism 160 into a first clamping position (as illustrated in FIG. 1C). Thus, as depicted in FIGS. 1A, 1B, and 1C, connection nozzle assembly 100 can be disposed in a first locking position. In at least one embodiment, connection nozzle assembly 100 can have an open or receiving configuration in the first locking position.

In the first locking position, nozzle sleeve 140 can be in a fully retracted position. Accordingly, clamp engaging element 145 can be disposed adjacent to the clamping member(s) 164, fluid product tube 102 can be disposed in a fully retracted position, drop pin 170 can be disposed in the raised position, and tube sleeve 130 can be disposed in the retracted position (such that opening(s) 38 are uncovered and/or unsealed (by tube sleeve 130) and fluid product opening(s) 112 are covered and/or sealed (by tube sleeve 130)). Moreover, guide elements 162a and 162b can be disposed within brackets 144a and 144b, respectively, and in the forward most position thereof in some embodiments. Accordingly, guide elements 162a and 162b can prevent body portion 142 from retracting further in second axial linear direction D2 when connection nozzle assembly 100 is disposed in the first locking position.

FIG. 1C also illustrates a receptacle coupling 1 separated from connection nozzle assembly 100 (i.e., not joined thereto). However, as illustrated in FIGS. 2A through 4B, connection nozzle assembly 100 can be brought into proximity with receptacle coupling 1, joined therewith, and secured thereto. Receptacle coupling 1 can comprise a tubular spout extending from a receptacle for storing a fluid product. As illustrated in FIG. 1C, receptacle coupling 1 can comprise a tubular spout having a receptacle dart or poppet 2 configured to seal closed a conduit 36 extending through the tubular portion thereof. Receptacle coupling 1 can also have an axial opening 37 in the end of conduit 36. In addition, receptacle coupling 1 can include one or more radial or circumferential openings 38 in the encircling side wall of conduit 36. Receptacle coupling 1 can further comprise an attachment flange 39 at the end of the encircling side wall adjacent to axial openings 37. As indicated above, receptacle coupling 1 can comprise a universal coupling and/or can have an industry standard design or configuration.

It will be appreciated that component numbering depicted in FIGS. 1A, 1B, and 1C can also indicate and/or designate the same component(s) of connection nozzle assembly 100 in FIGS. 2A-5. Accordingly, reference can be made to FIGS. 1A, 1B, and 1C for a more detailed understanding of FIGS. 2A-5.

Figure 2A:
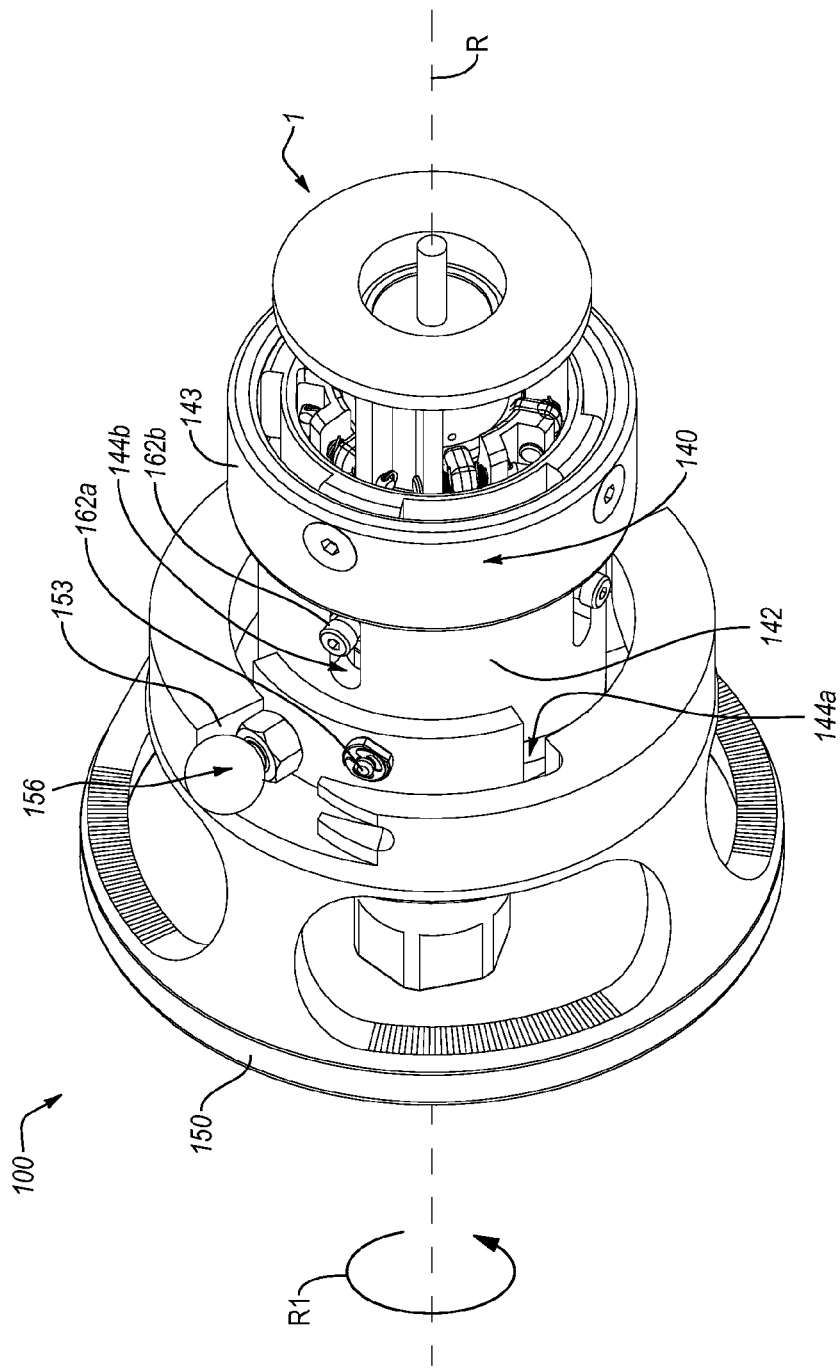
FIG. 2A illustrates a perspective view of the connection nozzle assembly of FIG. 1A in a second locking position according to an embodiment of the present disclosure.

FIGS. 2A-4B illustrate a series of perspective and cross-sectional views of connection nozzle assembly 100 being secured to receptacle coupling 1 an advancing through second, third, and fourth locking positions. For instance, FIGS. 2A and 2B illustrate, respectively, perspective and cross-sectional views of connection nozzle assembly 100 joined with a receptacle coupling 1 (and partially secured thereto) according to an embodiment of the present disclosure. Accordingly, FIGS. 2A and 2B also illustrates connection nozzle assembly 100 in a second locking position (e.g., an open and/or receiving position or configuration).

Connection nozzle assembly 100 can be joined with a receptacle coupling 1 while in the first locking position illustrated in FIG. 1C (i.e., with guide elements 162a and 162b disposed in the forward most position within brackets 144a and 144b, respectively and with clamping member(s) 164 in the open and/or receiving configuration). Attachment flange 39 of receptacle coupling 1 can abut locking mechanism 160 and/or another portion of connection nozzle assembly 100 (e.g., such that clamping member(s) 164 are disposed about attachment flange 39). Moreover, extended support members 147a of locking mechanism 160 can abut a portion of receptacle coupling 1. Accordingly, locking mechanism 160 can be advanced until receptacle coupling 1 prevents further forward movement. Thus, locking mechanism 160 (as well as rear portion 180 and handle 150 connected thereto) can be prevented from advancing further in first axial linear direction D1.

Figure 2B:
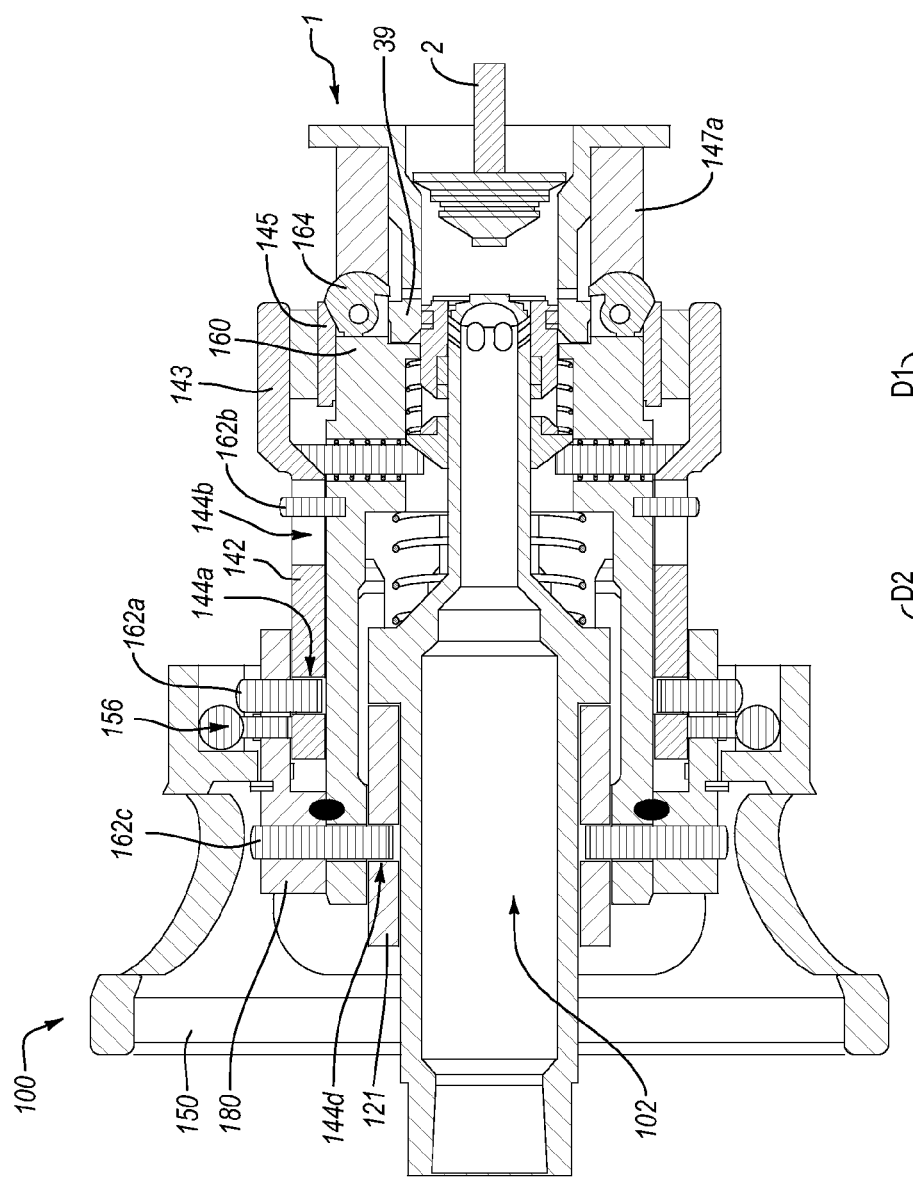
FIG. 2B illustrates a cross-sectional view of the connection nozzle assembly of FIG. 2A.

As illustrated in FIGS. 2A and 2B, connection nozzle assembly can be moved from the first locking position (illustrated it FIG. 1C) into a second locking position (illustrated in FIG. 2B). For instance, rear portion 180 of nozzle sleeve 140 can be rotated about the axis of rotation R in a first axial rotational direction R1 (e.g., by rotating handle 150) thereby advancing connection nozzle assembly 100 from the first locking position into the second locking position illustrated in FIGS. 2A and 2B. Specifically, handle 150 can be rotated in first axial rotational direction R1 causing inner wall 153 to engage and push locking element 156 in first axial rotational direction R1. Rotation of locking element 156 in first axial rotational direction R1 causes rotation of rear portion 180, which causes rotation of guide element 162a in first axial rotational direction R1, which causes guide element 162a to move within bracket 144a to a second position. As bracket 144a (and, therefore, body portion 142 of nozzle sleeve 140) yields to guide element 162a, body portion 142 is advanced forward in first axial linear direction D1 to a second locking position. As body portion 142 is advanced forward in first axial linear direction D1, bracket 144b also yields to guide element 162b. Accordingly, body portion 142 is substantially prevented from rotating about axis of rotation R because of guide element 144b.

Movement of body portion 142 in first axial linear direction D1 can cause movement of collar 143 and clamp engaging element 145 in first axial linear direction D1. Accordingly, clamp engaging element 145 can move partially over the top of clamping member(s) 164, causing (forward) rotation thereof (in a first radial rotational direction (i.e., clamping inward toward axis of rotation R). Clamping member(s) 164 can thereby move from the first clamping position (illustrated in FIG. 1C) to a second clamping position (illustrated in FIG. 2B). Clamping member(s) 164 can also partially engage attachment flange 39 of receptacle coupling 1, drawing receptacle coupling 1 into receiving area 105 in some embodiments.

In at least one embodiment, rotation of rear portion 180 can also cause movement of fluid product tube 102 in first axial linear direction D1, thereby disposing fluid product tube 102 closer to poppet 2 of receptacle coupling 1. For instance, rotation of rear portion 180 can cause rotation of guide element 162c and movement thereof within bracket 144d of (rear) guide sleeve 121. If the portion of bracket 144d in which guide element 162c is at least partially diagonally oriented in the second axial linear direction D2, rotation of guide element 162c will cause at least some forward movement of guide sleeve 121 in first axial linear direction D1. Such forward movement of guide sleeve 121 will thereby cause forward movement of tube 102. However, in at least one embodiment, tube 102 does not advanced forward far enough to contact and/or push poppet 2 in first axial linear direction D1.

Figure 3A:
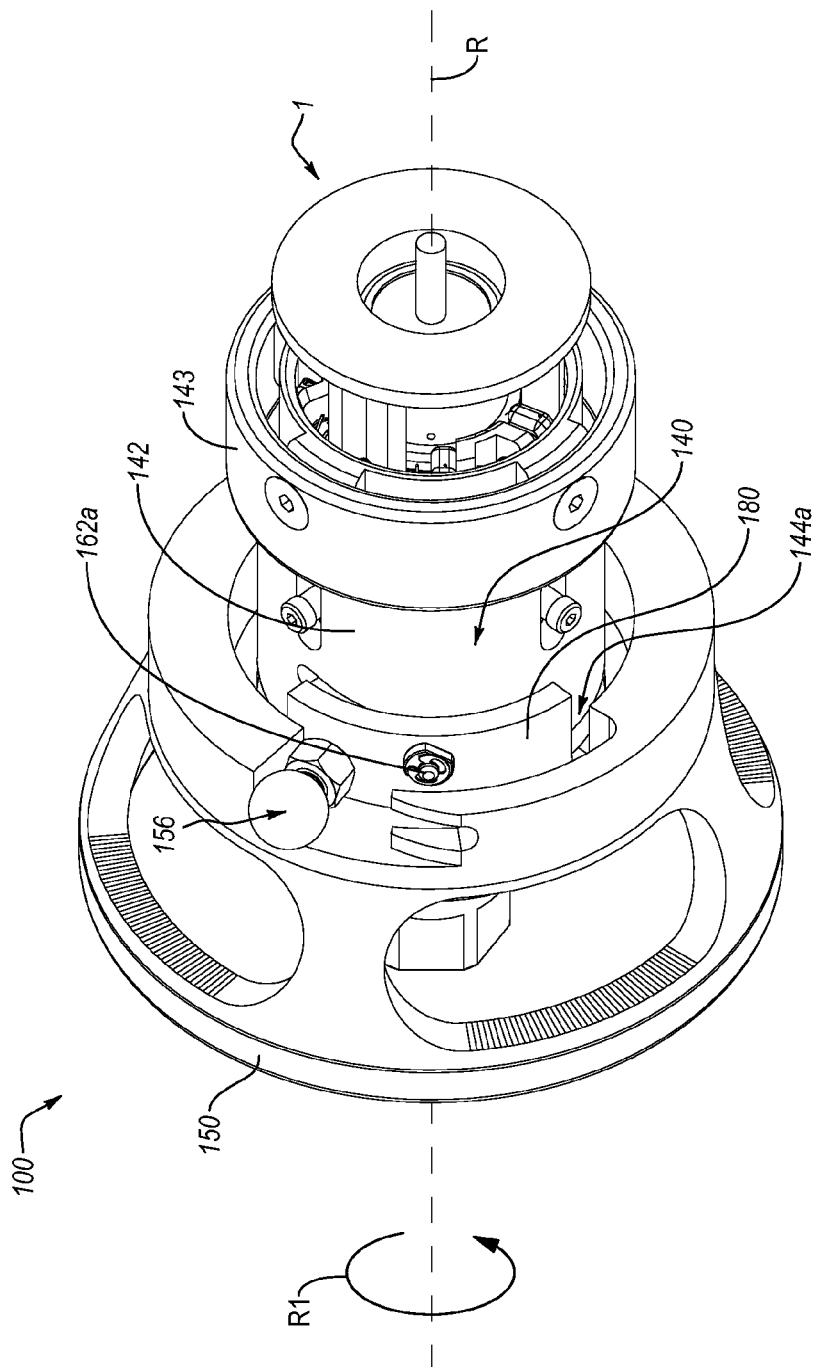
FIG. 3A illustrates a perspective view of the connection nozzle assembly of FIG. 1A in a third locking position.
Figure 3B:
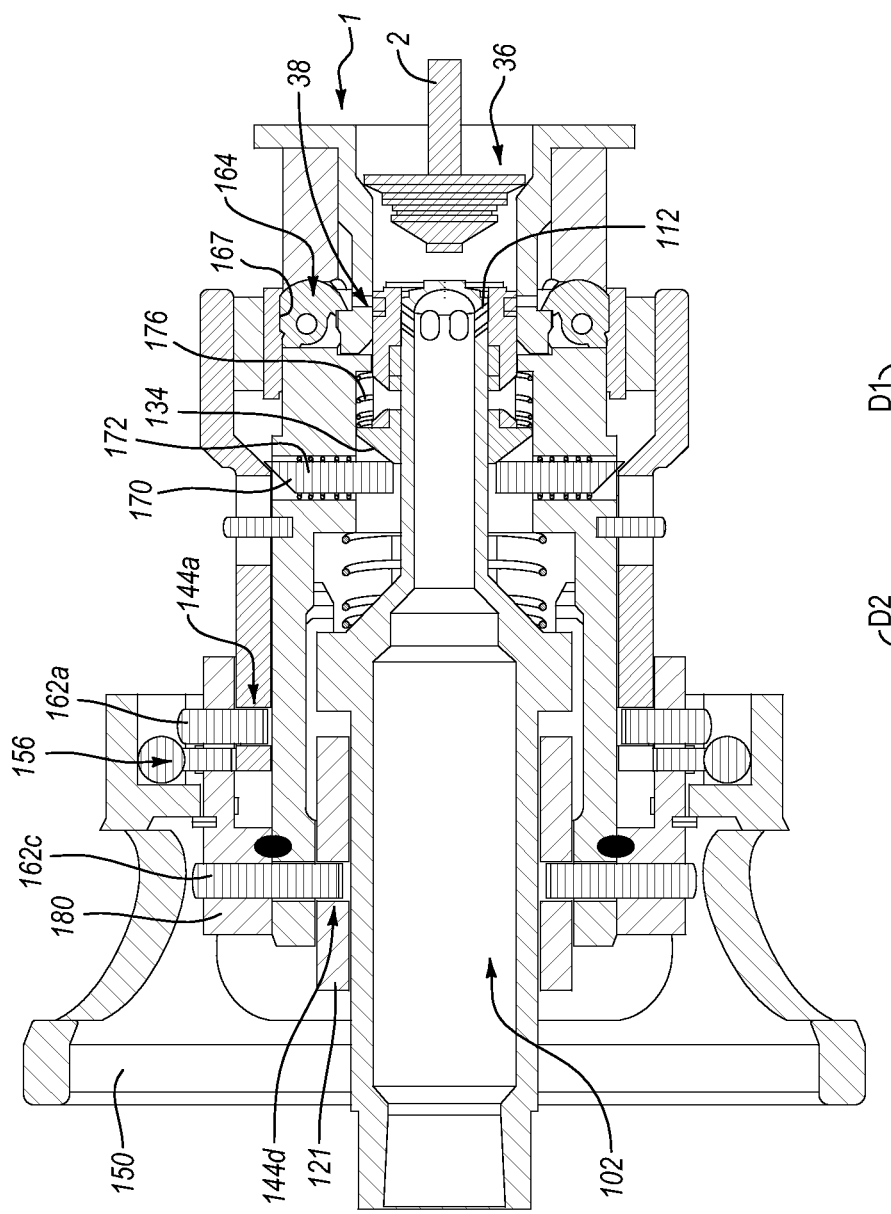
FIG. 3B illustrates a cross-sectional view of the connection nozzle assembly of FIG. 3A.

As illustrated in FIGS. 3A and 3B, connection nozzle assembly can be moved from the second locking position (illustrated it FIG. 2B) into a third locking position (illustrated in FIG. 3B). For instance, handle 150 can be further rotated about the axis of rotation R in first axial rotational direction R1. Further rotation of handle 150 can cause further rotational movement of the locking element 156, causing further rotational movement of rear portion 180, causing further rotational movement of guide element 162a in first axial rotational direction R1. Further rotational movement of guide element 162a in first axial rotational direction R1 and within bracket 144a causes body portion 142 to advance further forward in first axial linear direction D1 and into a third locking position.

Further movement of body portion 142 in first axial linear direction D1 can cause further movement of clamp engaging element 145 in first axial linear direction D1. Accordingly, clamp engaging element 145 can move further over the top of clamping member(s) 164, causing further (forward) rotation thereof (in the first radial rotational direction). Clamping member(s) 164 can thereby move from the second clamping position (illustrated in FIG. 2B) to a third clamping position (illustrated in FIG. 3B), drawing receptacle coupling 1 further into receiving area 105. In at least one embodiment, the third clamping position can comprise a completely clamped position. Accordingly, any additional forward movement of body portion 142 may not cause a corresponding rotation of clamping member(s) 164.

Body portion 142 (or a portion thereof) can also move over the top of drop pin 170 as it advances forward in first axial linear direction D1 (from the second locking position to the third locking position). For instance, body 142 and/or collar 143 can move forward over the top of drop pin 170, overcoming the force and/or biasing effect of first biasing element 172, depressing drop pin 170 into the lowered position as illustrated in FIG. 3B. As described previously, movement of drop pin 170 into the lowered position can cause axial linear movement of tube sleeve 130 in first axial linear direction D1 from the retracted position (illustrated in FIGS. 1C and 2B) into the forward position (illustrated in FIG. 3B). For instance, movement of drop pin 170 into the lowered position can apply a force to tube sleeve 130 on sloping edge 134 thereof, overcoming the biasing effect of third biasing element 176, and forcing tube sleeve 130 forward in first axial linear direction D1. Movement of tube sleeve 130 forward in first axial linear direction D1 can seal openings 38 in receptacle coupling 1.

The further rotational movement of rear portion 180 can also (optionally) cause further movement of fluid product tube 102 in the first axial linear direction D1, as described above, thereby disposing fluid product tube 102 even closer and/or adjacent to (e.g., into contact with) poppet 2 of receptacle coupling 1. However, in at least one embodiment, tube 102 does not advanced forward far enough to contact and/or push poppet 2 in first axial linear direction D1. Thus, in the first, second, and third locking positions, conduit 36 of receptacle coupling 1 can remain sealed by means of poppet 2. It will also be appreciated that in the first, second, and third locking positions, opening(s) 112 of fluid product tube 102 can remain covered, closed, and/or sealed (by means of tube sleeve 130).

Figure 4A:
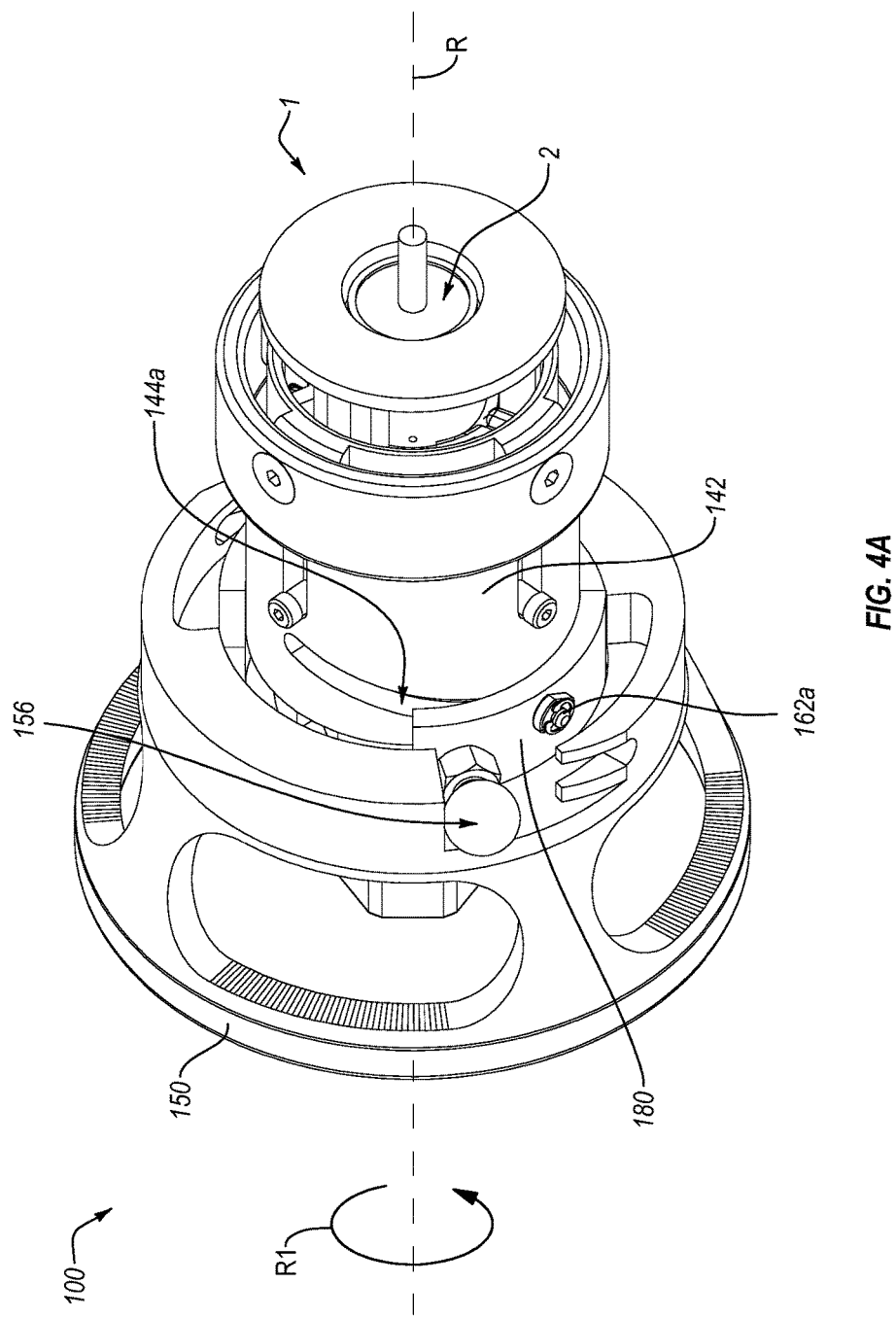
FIG. 4A illustrates a perspective view of the connection nozzle assembly of FIG. 1A in a fourth locking position.
Figure 4B:
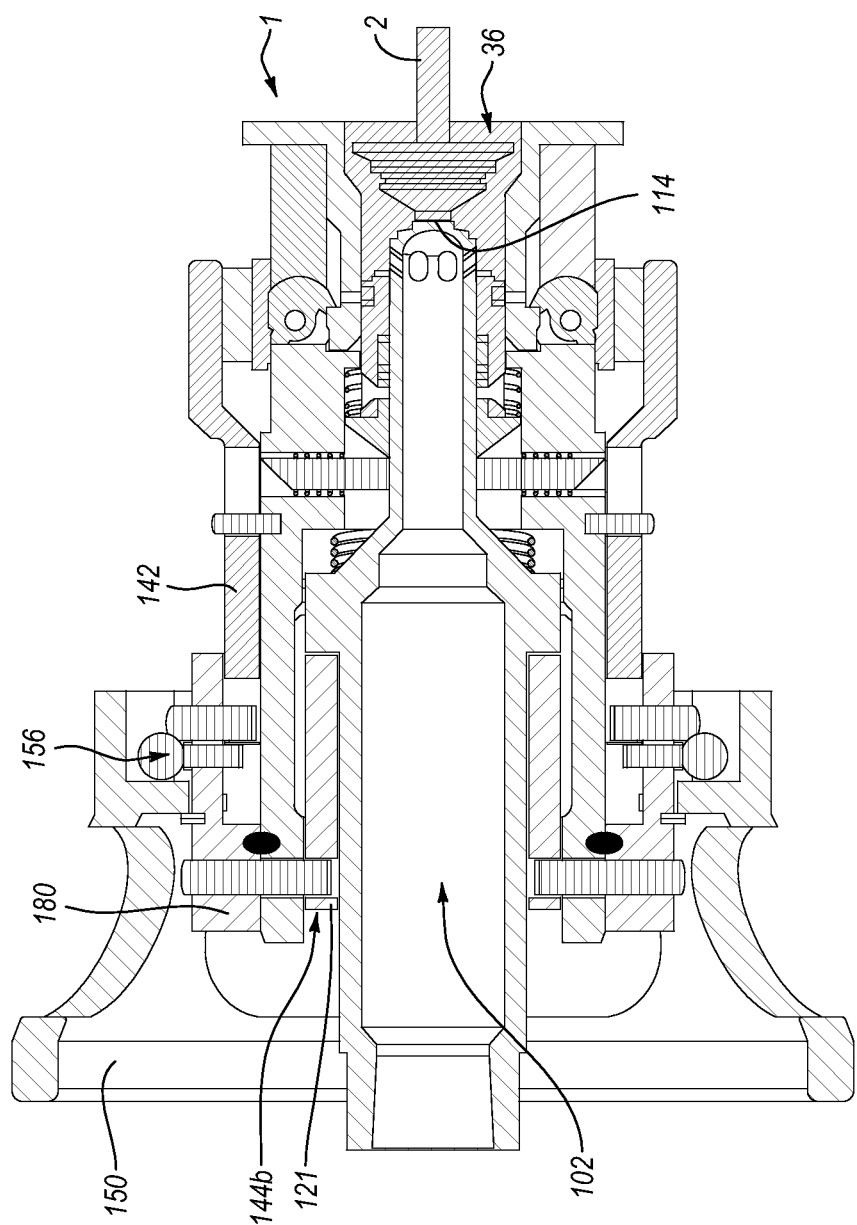
FIG. 4B illustrates a cross-sectional view of the connection nozzle assembly of FIG. 4A.

As illustrated in FIGS. 4A and 4B, connection nozzle assembly can be moved from the third locking position (illustrated it FIG. 3B) into a fourth locking position (illustrated in FIG. 4B). For instance, handle 150 can be further rotated about the axis of rotation R in first axial rotational direction R1. Further rotation of handle 150 can cause further rotational movement of the locking element 156, causing further rotational movement of rear portion 180, causing further rotational movement of guide element 162a within bracket 144a of body portion 142 (e.g., to a second end of bracket 144a). Further rotational movement of guide element 162a within bracket 144a causes body portion 142 to advance further forward in first axial linear direction D1 and into a third locking position.

Further movement of body portion 142 in first axial linear direction D1 can cause further movement of clamp engaging element 145 in first axial linear direction D1. However, the additional forward movement of body portion 142 may not cause a corresponding rotation of clamping member(s) 164. In other words, clamping member(s) 164 may remain in the (completely) clamped configuration (e.g., illustrated in FIG. 3B). Body portion 142 (or a portion thereof) can also move further over the top of drop pin 170 as it advances forward in first axial linear direction D1 (from the second locking position to the third locking position). In at least one embodiment, drop pin 170 can be fully depressed by the additional forward movement of body portion 142. However, in some embodiments, the additional forward movement of body portion 142 may not cause a corresponding movement of drop pin 170. In other words, drop pin 170 may remain in a (completely) depressed configuration as nozzle assembly 100 moves from the third locking position to the fourth locking position.

Importantly, in at least one embodiment, further movement of body portion 142 in first axial linear direction D1 can permit locking element 156 to move radially inward (toward fluid product tube 102). For instance, body portion 142 can move sufficiently forward in first axial linear direction D1, beyond the position of locking element 156. Accordingly, locking element 156 can be biased radially inward into a locked configuration. In the locked configuration, locking element 156 (or a component thereof) can prevent body portion 142 from moving in second axial linear direction D2 (e.g., under the force of biasing element 174). Thus, body portion 142 can be maintained in a forward, locking position.

The further rotational movement of rear portion 180 can also cause forward movement of (rear) guide sleeve 121 and, thereby, fluid product tube 102 in first axial linear direction D1, as described above. In at least one embodiment, fluid product tube 102 contacts and exerts a force against poppet 2 of receptacle coupling 1, thereby opening conduit 36 of receptacle coupling 1. Furthermore, opening(s) 112 of fluid product tube 102 can be uncovered (from inner sleeve 130) as tube 102 advances forward. Accordingly, conduit 110 can be placed in fluid communication with conduit 36 in the fourth locking position. Thus, as illustrated in FIG. 4B, a fluid product can flow through connection nozzle assembly 100 and into/through receptacle coupling 1 when connection nozzle assembly 100 is in the fourth locking position.

Those skilled in the art will appreciate that while the above method of operating connection nozzle assembly 100 has been describe as having four locking positions, that greater than or less than four locking positions are also contemplated herein. Thus, the above-described four locking positions are meant to illustrate the various movements of the various components of at least one embodiment of the present disclosure.

Figure 5:
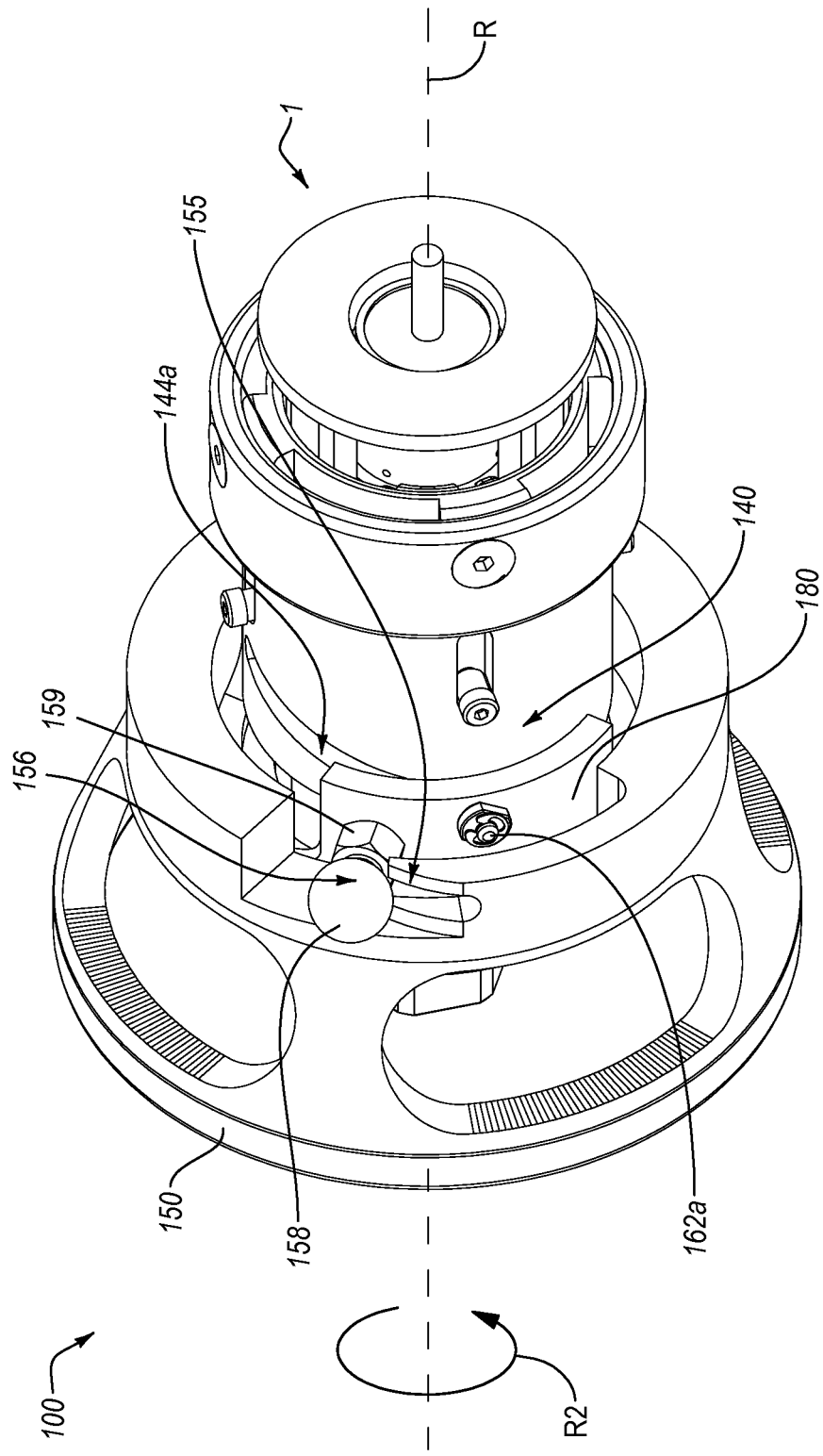
FIG. 5 illustrates a perspective view of the connection nozzle assembly of FIG. 1A in a first unlocking position according to an embodiment of the present disclosure.

In addition, connection nozzle assembly 100 can also be uncoupled from receptacle coupling 1. For instance, as illustrated in FIG. 5, handle 150 can be rotated in a second axial rotational direction R2, opposite the first axial rotational direction R1. This uncoupling rotation of handle 150 can cause wedge 155 to lift locking element 156. For instance, wedge 155 can comprise a fork (e.g., with opposing prongs having a sloping configuration from a pointed, narrow tip to a broad, widened base, and a space disposed between the opposing prongs). Accordingly, wedge 155 can slide between gripper 158 and fastener 159 (e.g., with the prongs of wedge 155 disposed on opposite sides of post or rod 157) such that as handle 150 continues to rotate in second axial rotational direction R2, the sloped configuration of wedge 155 raises locking element 156 into an unlocked configuration.

With locking element 156 in the unlocked configuration, further rotation of handle 150 in second axial rotational direction R2 can cause axial rotational movement of locking element 156 in second axial rotational direction R2, causing movement of rear portion 180 of outer nozzle sleeve 140 to move in second axial rotational direction R2, causing guide element 162a to move within bracket 144a in a direction opposite to that described above. As guide element 162a moves within bracket 144a in the opposite direction, the locking steps or movements described above can be performed in reverse order (e.g., from the fourth locking position, to the third, second, and eventually, first locking position) uncoupling the connection nozzle assembly 100 from receptacle coupling 1.

Figure 6B:
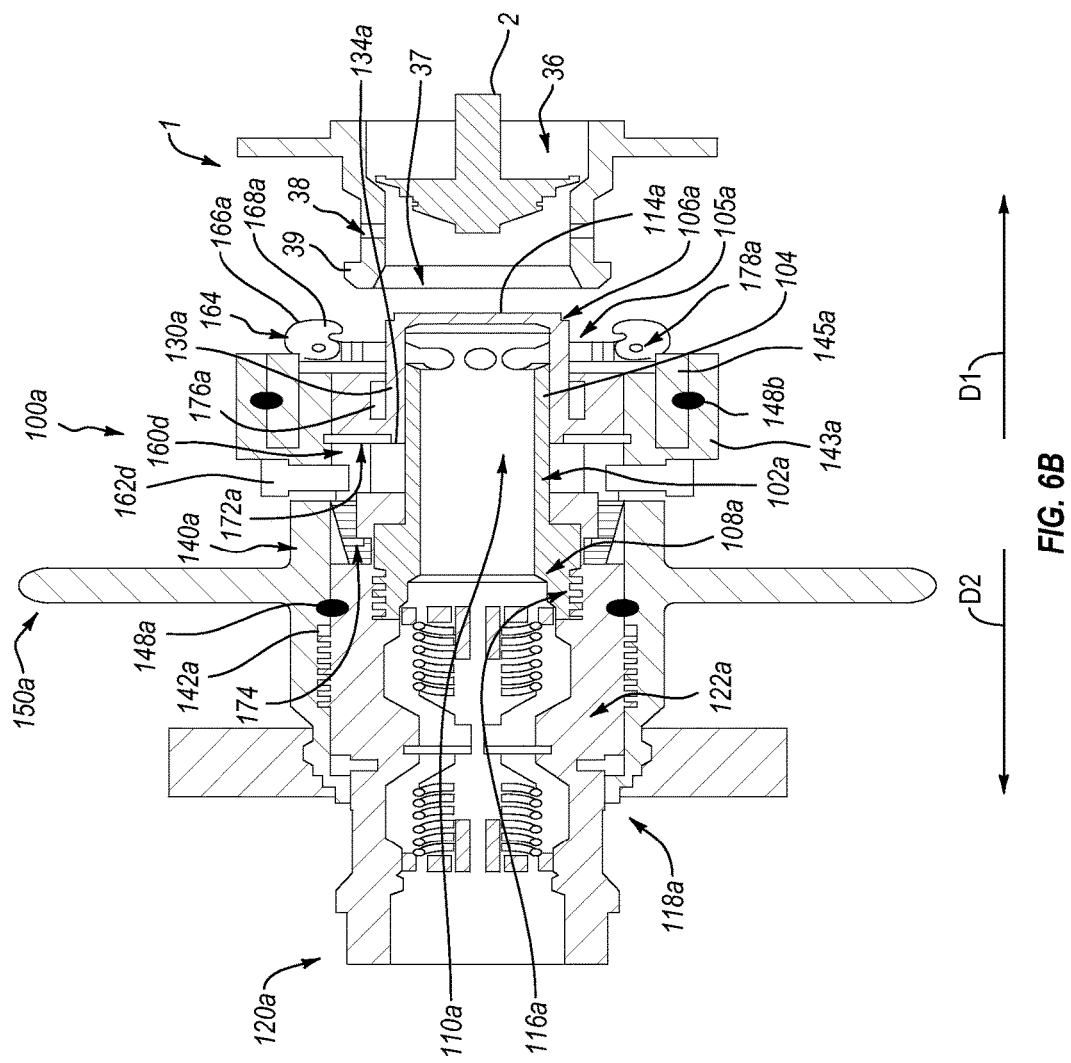
FIG. 6B illustrates a cross-sectional view of the connection nozzle assembly of FIG. 6A.

FIGS. 6A and 6B illustrate perspective and cross-sectional views, respectively, of an alternative connection nozzle assembly 100a in proximity to, but un-joined with receptacle coupling 1 according to an embodiment of the present disclosure. FIGS. 6A and 6B also illustrate connection nozzle assembly 100a in a first locking position (e.g., an open and/or receiving position or configuration). Connection nozzle assembly 100a can comprise many of the same and/or similar components of connection nozzle assembly 100 (see FIGS. 1A-5). However, connection nozzle assembly 100a can also comprise one or more components configured differently than those included in connection nozzle assembly 100. In addition, connection nozzle assembly 100a can also include one or more additional components not included in connection nozzle assembly 100 and/or can lack one or more components included in connection nozzle assembly 100.

For instance, as illustrated in FIGS. 6A and 6B, connection nozzle assembly 100a can include an inner fluid product tube 102a configured for transporting a fluid product. Fluid product tube 102a can have an encircling side wall 104a that extends axially from a first end 106a of fluid product tube 102a to an opposing second end 108a of fluid product tube 102a. First end 106a of tube 102a can correspond to a first end 101a of connection nozzle assembly 100a and end 108a can correspond to a second end 103a of connection nozzle assembly 100a.

Side wall 104a of fluid product tube 102a can at least partially bounds a fluid product conduit 110a extending through tube 102a. In certain embodiments, fluid product conduit 110a can comprise a void or space at least partially bound by side wall 104a. In other embodiments, fluid product conduit 110a can comprise a separate tube (having an encircling side wall and/or one or more fluid product openings) disposed within fluid product tube 102a.

Side wall 104a can also have at least one fluid product opening 112a therein. For instance, tube 102a can have a plurality of openings disposed circumferentially around side wall 104a. Fluid product tube 102a can also have an end wall 114a disposed at first end 106a. End wall 114a can have a closed configuration so as to substantially seal fluid product conduit 108a at first end 106a of fluid product tube 102a. Accordingly, the tube can have a closed end 106a and one or more openings 112a in side wall 104a adjacent to closed end 106a.

Second end 108a of tube 102a can be coupled to a fluid product source (not shown). For instance, second end 108a of tube 102a can comprise a threaded coupling 116a that can be attached to an adapter or coupling 118a. Adapter or coupling 118a can bring fluid product tube 102a (or conduit 110a thereof) into fluid communication with the fluid product source and/or can be selectively configurable so to do. Second end 108a of the tube 102a can also or alternatively be coupled to a conduit 120a (e.g., hose, pipe, etc.). Conduit 120a can be coupled to the fluid product source in some embodiments.

In at least one embodiment, second end 108a of the fluid product tube 102a can have at least one breakaway or breakaway element 122a attached thereto. For instance, second end 108a of the fluid product tube 102a can be connected to two halves or members of breakaway element 122a. In an alternative embodiment, breakaway element 122a can be coupled to a conduit (not shown) connected to second end 108a of tube 102a. For instance, a hose (not shown) can be disposed between fluid product tube 102a and breakaway element 122a in some embodiments. In at least one embodiment, separating breakaway element 122a from connection nozzle assembly 100a by a hose or pipe can reduce the weight of connection nozzle assembly 100a significantly. Accordingly, one or more embodiments can include connection nozzle assembly 100a having a first end of first conduit 120a coupled to second end 108a of tube 102a (or the second end of connection nozzle assembly 100a) and a second end of first conduit 120a coupled to breakaway element 122a. Breakaway element 122a can also be coupled to a first end of a second conduit 120a, with a second end of second conduit 120a coupled with a fluid product source.

Connection nozzle assembly 100a can also include a tube sleeve 130a disposed and/or secured about a portion of fluid product tube 102a. For instance, tube sleeve 130a can be disposed and/or secured about a portion of encircling side wall 104a and/or end wall 114a. Tube sleeve 130a can be adapted to selectively cover and uncover fluid product opening(s) 112a in side wall 104a and/or opening(s) 38 in receptacle coupling 1. Tube sleeve 130a can have a face 132a and a sloping edge 134a adjacent to and extending away from face 132a (in a second axial linear direction D2).

Connection nozzle assembly 100a can also include an outer nozzle sleeve 140a disposed about fluid product tube 102a and/or tube sleeve 130a. Nozzle sleeve 140a can comprise a body 142a having at least one (J-groove) bracket 144e disposed therein. Bracket 144e can have a plurality of slots 146 corresponding to a plurality of locking positions. For instance, bracket 144e can have a first slot 146a corresponding to the first locking position, a second slot 146b corresponding to a second locking position, a third slot 146c corresponding to a third locking position, and/or a fourth slot 146d corresponding to a fourth locking position.

Slots 146 can occupy and/or be disposed on or in different locations of body 142a of nozzle sleeve 140a. For instance, slots 146 can be separated by an axial linear distance and/or a circumferential distance. Nozzle sleeve 140a can also have a handle 150a for moving (e.g., rotating) nozzle sleeve 140a (about rotational axis R). Handle 150a can comprise one or more rods 152a extending from body 142a of nozzle sleeve 140a. Handle 150a can also include a circumferentially-disposed handle element 154a (e.g., wheel) disposed about body 142a of nozzle sleeve 140a and/or connected to rod(s) 152a.

As indicated above, nozzle sleeve 140a can be rotatable about one or more additional components of connection nozzle assembly 100a. For instance, nozzle sleeve 140a can be rotatable about fluid product tube 104a and/or one or more adapters or couplings 118a connected thereto. Accordingly, connection nozzle assembly 100a can comprise one or more rotational elements 148a in some embodiments. Rotational element 148a can comprise one or more bearings, ball bearings, race bearings, bearing chambers, race bearing chambers, etc.

Nozzle sleeve 140a can comprise a collar 143a that extends radially outward from body 142a. Collar 143a can be rotationally coupled to a clamp engaging element 145a in some embodiments. Accordingly, nozzle sleeve 140a (or collar 143a thereof) can be rotatable about clamp engaging element 145a (e.g., by means of a rotational element 148b). Thus, nozzle sleeve 140a (or one or more components thereof) can be rotationally coupled to and/or rotatable about one or more other components of connection nozzle assembly 100a.

Connection nozzle assembly 100a can also include a locking mechanism 160a, which can be disposed between a portion of tube sleeve 130a and a portion of nozzle sleeve 140a in some embodiments. Accordingly, tube sleeve 130a can be disposed at least partially between fluid product tube 102a and locking mechanism 160a. Locking mechanism 160a can include a guide element 162d (e.g., shoulder bolt, post, etc.) extending into bracket 144a. Guide element 162d can have a rigid configuration suitable for movement and/or disposition within bracket 144a. For instance, nozzle sleeve 140a can put a significant amount of force on guide element 162d (e.g., as nozzle sleeve 140a is biased in second axial linear direction D2). Accordingly, guide element 162d can be sufficiently rigid to maintain structural integrity under the biasing force(s) placed on nozzle sleeve 140a.

Locking mechanism 160a can also include at least one clamping member 164a. In certain embodiments, clamping member(s) 164a can be disposed adjacent to first end 106a of fluid product tube 102a. Clamping member(s) 164a and first end 106a of fluid product tube 102a can also be adjacent to and/or associated with first end 101a of connection nozzle assembly 100a and/or nozzle sleeve 140a thereof. Clamping member(s) 164a can comprise an at least partially circular or elliptical body 166a, can have at least one substantially flat surface 167a, and/or can also have a recessed notch 168a disposed in body 166a. Locking mechanism 160a can also include at least one drop pin 170a.

In some embodiments, connection nozzle assembly 100a can also include one or more biasing elements (e.g., springs (e.g., linear springs and/or torsion spring), coils, elastomeric elements, cushions, etc.). For instance, the connection nozzle assembly can include a first biasing element 172a that biases drop pin 170a in or into a raised position. Connection nozzle assembly 100a can also include a second biasing element 174a that biases locking mechanism 160a in a first direction and/or biases nozzle sleeve 140a in a second direction opposite the first direction. For instance, second biasing element 174a can bias locking mechanism 160a in first axial linear direction D1 and/or can bias nozzle sleeve 140a in second axial linear direction D2. In at least one embodiment, second biasing element 174a can be disposed between a portion of locking mechanism 160a and a portion of nozzle sleeve 140a. Alternatively, second biasing element 174a can be disposed between a portion of locking mechanism 160a and a portion of an attachment element (e.g., adapter or coupling 118a and/or a hose or tube) to which nozzle sleeve 140a is coupled.

In some embodiments, connection nozzle assembly 100a can also include a third biasing element 176a that biases tube sleeve 130a in second axial linear direction D2. Third biasing element 176a can also bias locking mechanism 160a in first axial linear direction D1 in some embodiments. In certain embodiments, connection nozzle assembly 100a can also include a fourth biasing element 178a that biases one or more clamping members 164a of locking mechanism 160a into a first clamping position.

Connection nozzle assembly 100a can be joined with a receptacle coupling 1 while nozzle sleeve 140a is in the first locking position (i.e., with guide element 162d disposed within first slot 146a of bracket 144e and with clamping member(s) 164a in the open and/or receiving configuration). Attachment flange 39 of receptacle coupling 1 can abut locking mechanism 160a and/or another portion of connection nozzle assembly 100a (e.g., such that clamping member(s) 164a are disposed about attachment flange 39).

The first locking position of nozzle sleeve 140a can comprise a fully retracted position. Accordingly, clamp engaging element 145a can be disposed adjacent to the clamping member(s) 164a, fluid product tube 102a can be disposed in a fully retracted position, drop pin 170a can be disposed in the raised position, and tube sleeve 130a can be disposed in the retracted position (such that opening(s) 38 are uncovered and/or unsealed (by tube sleeve 130*a*) and fluid product opening(s) 112*a* are covered and/or sealed (by tube sleeve 130*a*)).

Nozzle sleeve 140*a* can be rotated about the axis of rotation R in first axial rotational direction R1. Rotation of nozzle sleeve 140*a* can cause guide element 162*d* to be move from first slot 146*a* into second slot 146*b*. Those skilled in the art will appreciate that while nozzle sleeve 140*a* can be actively moved and/or rotated, guide element 162*d* can still be deemed to have been moved to relative to nozzle sleeve 140*a*. Positioning of guide element 162*d* in second slot 146*b* can indicate, constitute, and/or correspond to a second locking position.

Moreover, because the edge of slot 146*b* is moved or retracted in the second axial linear direction D2 (relative to the first slot 146*a*), rotation of nozzle sleeve 140*a* in first axial rotational direction R1 can also cause nozzle sleeve 140*a* to move (forward) in first axial linear direction D1 (relative to guide element 162*d*) as guide element 162*d* moves from first slot 146*a* into second slot 146*b*.

Movement of nozzle sleeve 140*a* in first axial linear direction D1 can also cause movement of clamp engaging element 145*a* in first axial linear direction D1. Accordingly, clamp engaging element 145*a* can move partially over the top of clamping member(s) 164*a*, causing (forward) rotation thereof (in a first radial rotational direction (i.e., clamping inward toward axis of rotation R). Clamping member(s) 164*a* can thereby move from the first clamping position to a second clamping position. Clamping member(s) 164*a* can also engage attachment flange 39 of receptacle coupling 1, drawing receptacle coupling 1 into receiving area 105*a*.

Movement of nozzle sleeve 140*a* in first axial linear direction D1 can also cause movement of fluid product tube 102*a* in first axial linear direction D1, thereby disposing fluid product tube 102*a* closer to poppet 2 of receptacle coupling 1.

Nozzle sleeve 140*a* can be further rotated about the axis of rotation R in first axial rotational direction R1. Further rotation of nozzle sleeve 140*a* can cause guide element 162*d* to be move from second slot 146*b* into third slot 146*c*. Positioning of guide element 162*d* in third slot 146*c* can indicate, constitute, and/or correspond to a third locking position. This further rotation of nozzle sleeve 140*a* in first axial rotational direction R1 can also cause nozzle sleeve 140*a* to move (forward) further in first axial linear direction D1 (relative to guide element 162*d*).

Further movement of nozzle sleeve 140*a* in first axial linear direction D1 can cause further movement of clamp engaging element 145*a* in first axial linear direction D1. Accordingly, clamp engaging element 145*a* can move further over the top of clamping member(s) 164*a*, causing further (forward) rotation thereof (in the first radial rotational direction). Clamping member(s) 164*a* can thereby move from the second clamping position to a third clamping position. Clamping member(s) 164*a* can again draw receptacle coupling 1 further into receiving area 105*a*.

Nozzle sleeve 140*a* (or a portion thereof) can also move over the top of drop pin 170*a* as it advances forward in first axial linear direction D1 (from the second locking position to the third locking position). For instance, body 142*a* and/or collar 143*a* can move forward over the top of drop pin 170*a*, overcoming the force and/or biasing effect of first biasing element 172*a*, depressing drop pin 170*a* into a lowered position. As described previously, movement of drop pin 170*a* into the lowered position can cause axial linear movement of tube sleeve 130*a* in first axial linear direction D1 from the retracted position into the forward position. For instance, movement of drop pin 170*a* into the lowered position can apply a force to tube sleeve 130*a* on sloping edge 134*a* thereof, overcoming the biasing effect of third biasing element 176*a*, and forcing tube sleeve 130*a* forward in the first axial linear direction D1.

The further movement of nozzle sleeve 140*a* in first axial linear direction D1 can also cause further movement of fluid product tube 102*a* in first axial linear direction D1, thereby disposing fluid product tube 102*a* even closer and/or adjacent to (e.g., into contact with) poppet 2 of receptacle coupling 1. Those skilled in the art will appreciate that in the first, second, and third locking positions, opening(s) 112*a* can be covered, closed, and/or sealed (by means of tube sleeve 130*a*).

Nozzle sleeve 140*a* can be further rotated about the axis of rotation R in first axial rotational direction R1. Further rotation of nozzle sleeve 140*a* can cause guide element 162*d* to be move from third slot 146*c* into fourth slot 146*d*. Positioning of guide element 162*d* in fourth slot 146*d* can indicate, constitute, and/or correspond to a fourth locking position. This further rotation of nozzle sleeve 140*a* in first axial rotational direction R1 can also cause nozzle sleeve 140*a* to move (forward) further in first axial linear direction D1 (relative to guide element 162*d*).

Further movement of nozzle sleeve 140*a* in first axial linear direction D1 can cause further movement of clamp engaging element 145*a* in first axial linear direction D1 over the top of clamping member(s) 164*a*. In some embodiments, movement of clamp engaging element 145*a* in first axial linear direction D1 over the top of clamping member(s) 164*a* can cause further (forward) rotation thereof (in a first radial rotational direction). Clamping member(s) 164*a* can thereby move from the third clamping position to a fourth clamping position in some embodiments, optionally drawing receptacle coupling 1 further into receiving area 105*a*.

However, in at least one embodiment, clamping member(s) 164*a* remain in the third clamping position upon further movement of nozzle sleeve 140*a* in first axial linear direction D1. For instance, as indicated above, clamping member(s) 164*a* can comprise at least one substantially flat surface 167*a*. Rotation of clamping member(s) 164*a* such that the nozzle sleeve 140*a* is disposed against substantially flat surface 167*a* of clamping member(s) 164*a* can allow nozzle sleeve 140*a* and/or clamp engaging member 145*a* to pass over clamping member(s) 164*a* without (necessarily) continuing to rotate clamping member(s) 164*a*. Accordingly, clamping member(s) 164*a* can rotate to a final and/or completely secured clamping position in certain embodiments. Thus, further movement of nozzle sleeve 140*a* over clamping member(s) 164*a* may not further rotate clamping member(s) 164*a* in some embodiments.

It will also be appreciated that rotation of clamping member(s) 164*a* such that the nozzle sleeve 140*a* and/or clamp engaging member 145*a* is disposed against substantially flat surface 167*a* of clamping member(s) 164*a* can be accomplished in other locking positions (e.g., the second or third locking position(s)).

Nozzle sleeve 140*a* (or a portion thereof) can also move further over the top of drop pin 170*a* as it advances forward in first axial linear direction D1, maintaining drop in 170*a* in the depressed and/or lowered configuration thereby maintaining tube sleeve 130*a* in the forward position and covering opening(s) 38 of receptacle coupling 1.

The further movement of nozzle sleeve 140*a* in first axial linear direction D1 can also cause further movement of fluid product tube 102*a* in first axial linear direction D1, thereby pressing fluid product tube 102*a* (or end wall 114*a* thereof)

into poppet 2 of receptacle coupling 1 with a force sufficient to move poppet 2 in first axial linear direction D1. For instance, end wall 114a can be sufficiently rigid, structured, and/or strong to move poppet 2 without substantially giving way thereto. Movement of poppet 2 in first axial inner direction D1 can open conduit 36 of receptacle coupling 1. The further movement of fluid product tube 102a in first axial linear direction D1 can also cause opening(s) 112a to extend beyond tube sleeve 130a, thereby uncovering and/or unsealing opening(s) 112a, bringing conduit 110a of fluid product tube 102a into fluid communication with the conduit 36 of receptacle coupling 1.

Accordingly, in the fourth locking position, a fluid product can flow between conduit 110a of fluid product tube 102a into fluid communication with the conduit 36 of receptacle coupling 1. For instance, connection nozzle assembly 100a can be connected to a (pressurized) fluid source, which can provide a fluid product that flows through connection nozzle assembly 100a and into a receptacle by means of the connection between connection nozzle assembly 100a and receptacle coupling 1.

Those skilled in the art will appreciate that one or more of the configurations (and/or configuration changes) associated with the first locking position, second locking position, third locking position, and/or fourth locking position (and/or passing therebetween) can be combined. For instance, in at least one alternative embodiment, nozzle sleeve 140a can be moved directly from the first locking position to the third locking position and/or vice versa. Accordingly, in some embodiments, bracket 144e can comprise less than four slots 146 without necessarily departing from the scope of this disclosure. Bracket 144e can alternatively comprise more than four slots 146 without necessarily departing from the scope of this disclosure.

Connection nozzle assembly 100a can also be uncoupled from receptacle coupling 1 by rotating nozzle sleeve 140a (e.g., by means of handle 150a) in second axial rotational direction R2, which can dispose guide element 162d (sequentially) from slot 146d, to slot 146c, to slot 146b, and/or to slot 146a.

Accordingly, the exemplary embodiments described herein can provide secure connection between a fluid source and a receptacle by means of the connection nozzle assemblies and/or receptacle couplings described herein.

The above-described implementations of the present disclosure are meant to be illustrative of exemplary and/or preferred implementations and are not intended to limit the scope of the present disclosure. The only limitations to the scope of the present invention are set forth in the following claims appended hereto. While various aspects and implementations have been disclosed herein, other aspects and implementations are contemplated. Thus, while the foregoing is directed to certain implementations of the present disclosure, other and further implementations of the disclosure can be devised without departing from the basic scope thereof. Various modifications, which would be readily apparent to one skilled in the art, are intended to be within the scope of the present disclosure. In addition, implementations of the present disclosure are further scalable to allow for additional components, modules, subunits, systems, elements, members, and/or users, etc., as particular applications can require.

The present disclosure can be embodied in other specific forms without departing from its spirit or essential characteristics. The described implementations are to be considered in all respects only as illustrative and not restrictive. The scope of the invention is, therefore, indicated by the appended claims rather than by the foregoing description. While certain implementations and details have been included herein and in the attached invention disclosure for purposes of illustrating the invention, it will be apparent to those skilled in the art that various changes in the methods and apparatus disclosed herein can be made without departing from the scope of the invention, which is defined in the appended claims. All changes which come within the meaning and range of equivalency of the claims are to be embraced within their scope.

What is claimed is:

1. A connection nozzle assembly, comprising:
   an inner fluid product tube;
   an outer nozzle sleeve disposed about the fluid product tube and moveable between a plurality of locking positions, the nozzle sleeve being movably disposed about the fluid product tube such that the nozzle sleeve can move axially relative to the fluid product tube; and
   a locking mechanism disposed between the fluid product tube and the nozzle sleeve, the locking mechanism comprising at least one clamping member moveable between a plurality of clamping positions.

2. The connection nozzle assembly as recited in claim 1, wherein the fluid product tube comprises:
   an encircling side wall extending axially from a first end of the fluid product tube to an opposing second end of the fluid product tube and at least partially bounding a fluid product conduit extending through the fluid product tube;
   at least one fluid product opening in the encircling side wall adjacent to the second end of the fluid product tube; and
   an end wall disposed at the first end thereof, the end wall having a closed configuration so as to substantially seal the fluid product conduit at the first end of the fluid product tube.

3. The connection nozzle assembly as recited in claim 2, wherein the connection nozzle assembly further comprising a tube sleeve moveably secured about a portion of the encircling side wall and adapted to selectively cover and uncover the at least one fluid product opening.

4. The connection nozzle assembly as recited in claim 3, wherein the tube sleeve is disposed at least partially between the fluid product tube and the locking mechanism and the locking mechanism is disposed at least partially between the tube sleeve and the nozzle sleeve.

5. The connection nozzle assembly as recited in claim 3, further comprising:
   a first biasing element that biases a drop pin of the locking mechanism into a raised position;
   a second biasing element that biases the locking mechanism in a first direction and biases the nozzle sleeve in a second direction opposite the first direction; and
   a third biasing element that biases the locking mechanism in the first direction and biases the tube sleeve in the second direction, the drop pin substantially preventing movement of the tube sleeve thereby in the second direction relative to the locking mechanism.

6. The connection nozzle assembly as recited in claim 1, wherein the nozzle sleeve comprises a body portion having at least one bracket disposed therein.

7. The connection nozzle assembly as recited in claim 6, wherein the nozzle sleeve further comprises a rear portion connected to the body portion, the connection nozzle assembly further comprising at least one guide element extending from the rear portion into the at least one bracket.

8. The connection nozzle assembly as recited in claim 7, further comprising:
a guide sleeve disposed about a portion of the fluid product tube, the guide sleeve having a bracket disposed therein; and
a second guide element extending from the rear portion of the nozzle sleeve into the bracket of the guide sleeve, wherein the locking mechanism comprises a bracket, the second guide element passing through the bracket of the locking mechanism.

9. The connection nozzle assembly as recited in claim 1, wherein the locking mechanism is disposed at least partially between the fluid product tube and the nozzle sleeve, the at least one clamping member comprising an at least partially circular or elliptical body and a recessed notch disposed in the body, the locking mechanism further comprising at least one drop pin moveable between a raised position and a lowered position.

10. The connection nozzle assembly as recited in claim 1, further comprising at least one breakaway element connected to a second end of the fluid product tube.

11. The connection nozzle assembly as recited in claim 10, further comprising a conduit disposed between the fluid product tube and the at least one breakaway element.

12. A connection nozzle assembly, comprising:
an inner fluid product tube having at least one fluid product opening therein;
an outer nozzle sleeve disposed about the fluid product tube and moveable between a plurality of locking positions, the nozzle sleeve having a body portion with at least one bracket disposed therein, the bracket having at least one guide element extending therein; and
a locking mechanism disposed between the fluid product tube and the nozzle sleeve, the locking mechanism comprising at least one clamping member moveable between a plurality of clamping positions and at least one drop pin moveable between a raised position and a lowered position,
wherein, in a first locking position, the body portion of the nozzle sleeve and the fluid product tube are disposed in a fully retracted position such that:
the at least one guide element is disposed in a first position in the bracket;
a first portion of the body portion is disposed beside the at least one clamping member such that the at least one clamping member is in a first clamping position; and
a second portion of the body portion is disposed beside the at least one drop pin such that the at least one drop pin is in the raised position such that a tube sleeve is disposed in a retracted position and covers the at least one fluid product opening.

13. The connection nozzle assembly as recited in claim 12, wherein in a second locking position, the body portion of the nozzle sleeve is advanced forward in a first axial direction relative to the nozzle sleeve in the first locking position such that:
the guide element is disposed in a second position within the bracket adjacent to the first position;
the first portion of the body portion is disposed partially over the at least one clamping member such that the at least one clamping member is in a second clamping position rotationally offset in a first radial rotational direction relative to the first clamping position; and
the second portion of the body portion is disposed beside the at least one drop pin such that the at least one drop pin is in the raised position such that the tube sleeve is disposed in the retracted position and covers the at least one fluid product opening.

14. The connection nozzle assembly as recited in claim 13, wherein in a third locking position, the body portion of the nozzle sleeve is advanced forward in the first axial direction relative to the nozzle sleeve in the second locking position such that:
the guide element is disposed in a third position within the bracket adjacent to the second position;
the first portion of the body portion is disposed further over the at least one clamping member such that the at least one clamping member is in a third clamping position rotationally offset in the first radial rotational direction relative to the second clamping position; and
the second portion of the body portion is disposed over the at least one drop pin such that the at least one drop pin is depressed in the lowered position such that the tube sleeve is advanced forward in the first axial direction relative to the second locking position and covers the at least one fluid product opening.

15. The connection nozzle assembly as recited in claim 14, wherein in a fourth locking position, the body portion of the nozzle sleeve is advanced forward in the first axial direction relative to the nozzle sleeve in the third locking position and the fluid product tube is advanced forward in the first axial direction relative to the fluid product tube in the third locking position such that:
the guide element is disposed in a fourth position within the bracket adjacent to the third position;
the first portion of the body portion is disposed over the at least one clamping member;
the second portion of the body portion is disposed over the at least one drop pin such that the at least one drop pin is depressed in the lowered position; and
the at least one fluid product opening is uncovered.

16. A connection nozzle assembly, comprising:
an inner fluid product tube;
an outer nozzle sleeve disposed about the fluid product tube and moveable between a plurality of locking positions, the nozzle sleeve comprising a body portion having at least one bracket disposed therein and a rear portion connected to the body portion;
at least one guide element extending from the rear portion into the at least one bracket; and
a locking mechanism disposed between the fluid product tube and the nozzle sleeve, the locking mechanism comprising at least one clamping member moveable between a plurality of clamping positions.

17. The connection nozzle assembly as recited in claim 16, further comprising:
a guide sleeve disposed about a portion of the fluid product tube, the guide sleeve having a bracket disposed therein; and
a second guide element extending from the rear portion of the nozzle sleeve into the bracket of the guide sleeve, wherein the locking mechanism comprises a bracket, the second guide element passing through the bracket of the locking mechanism.

18. The connection nozzle assembly as recited in claim 16, wherein the fluid product tube comprises:
an encircling side wall extending axially from a first end of the fluid product tube to an opposing second end of the fluid product tube;
at least one fluid product opening in the encircling side wall adjacent to the second end of the fluid product tube; and an end wall disposed at the first end thereof, the end wall having a closed configuration so as to substantially seal the fluid product conduit at the first end of the fluid product tube.

19. The connection nozzle assembly as recited in claim 18, wherein the connection nozzle assembly further comprising a tube sleeve moveably secured about a portion of the encircling side wall and adapted to selectively cover and uncover the at least one fluid product opening.

20. The connection nozzle assembly as recited in claim 19, wherein the tube sleeve is disposed at least partially between the fluid product tube and the locking mechanism and the locking mechanism is disposed at least partially between the tube sleeve and the nozzle sleeve.

21. The connection nozzle assembly as recited in claim 19, further comprising:
 a first biasing element that biases a drop pin of the locking mechanism into a raised position;
 a second biasing element that biases the locking mechanism in a first direction and biases the nozzle sleeve in a second direction opposite the first direction; and
 a third biasing element that biases the locking mechanism in the first direction and biases the tube sleeve in the second direction, the drop pin substantially preventing movement of the tube sleeve thereby in the second direction relative to the locking mechanism.

22. The connection nozzle assembly as recited in claim 16, wherein the locking mechanism is disposed at least partially between the fluid product tube and the nozzle sleeve, the at least one clamping member comprising an at least partially circular or elliptical body and a recessed notch disposed in the body, the locking mechanism further comprising at least one drop pin moveable between a raised position and a lowered position.

* * * * *